(12) United States Patent
Ichiyama

(10) Patent No.: US 8,373,325 B2
(45) Date of Patent: Feb. 12, 2013

(54) ROTATING ELECTRIC MACHINE SYSTEM

(75) Inventor: Yoshikazu Ichiyama, Kyoto (JP)

(73) Assignee: Kura Laboratory Corporation, Kyoto-Shi (JP)

( * ) Notice: Subject to any disclaimer, the term of this patent is extended or adjusted under 35 U.S.C. 154(b) by 178 days.

(21) Appl. No.: 12/902,441

(22) Filed: Oct. 12, 2010

(65) Prior Publication Data

US 2011/0084567 A1 Apr. 14, 2011

(30) Foreign Application Priority Data

Oct. 13, 2009 (JP) ................................. 2009-235994
Mar. 16, 2010 (JP) ................................. 2010-58843
Apr. 15, 2010 (JP) ................................. 2010-107686

(51) Int. Cl.
*H02K 21/04* (2006.01)
(52) U.S. Cl. ........................................ 310/181; 310/180
(58) Field of Classification Search ......... 310/179–181, 310/190, 156.06, 156.07, 156.19, 156.84; H02K 21/04
See application file for complete search history.

(56) References Cited

U.S. PATENT DOCUMENTS

| | | | | |
|---|---|---|---|---|
| 4,972,112 A * | 11/1990 | Kim | ............................... | 310/181 |
| 6,509,664 B2 * | 1/2003 | Shah et al. | ..................... | 310/181 |
| 6,800,977 B1 | 10/2004 | Ostovic | | |
| 7,567,006 B2 | 7/2009 | Ichiyama | | |
| 7,777,384 B2 * | 8/2010 | Gieras et al. | ................... | 310/180 |
| 7,999,432 B2 * | 8/2011 | Ichiyama | ....................... | 310/190 |
| 8,242,653 B2 * | 8/2012 | Ichiyama | ................. | 310/156.44 |
| 2009/0236923 A1 | 9/2009 | Sakai et al. | | |
| 2009/0261774 A1 | 10/2009 | Yuuki et al. | | |
| 2010/0060223 A1 | 3/2010 | Sakai et al. | | |
| 2010/0171385 A1 | 7/2010 | Sakai et al. | | |
| 2010/0201294 A1 | 8/2010 | Yuuki et al. | | |

FOREIGN PATENT DOCUMENTS

JP 07-336980 12/1995

* cited by examiner

*Primary Examiner* — Hanh Nguyen
*Assistant Examiner* — Naishadh Desai
(74) *Attorney, Agent, or Firm* — Ditthavong Mori & Steiner, P.C.

(57) ABSTRACT

A rotating electric machine system includes a rotor having a rotor plane. The rotor includes magnetic salient poles in a circumferential direction on the rotor plane. Adjacent magnetic salient poles are magnetized in different polarities from each other by a permanent magnet. A control magnet is arranged in an inside part of the adjacent magnetic salient poles. An excitation coil is placed so as to make an excitation flux collectively in the rotor. The magnetization state of the control magnet where the magnetic flux by the armature coils and the excitation flux flow in a same direction is changed irreversibly. An amount of the magnetic flux flowing through the armature coils is controlled by changing the magnetization state of the control magnet in accordance with an output of the rotating electric machine system so that the output is optimized.

18 Claims, 28 Drawing Sheets

ROTATING ELECTRIC MACHINE SYSTEM

CROSS-REFERENCE TO RELATED APPLICATIONS

The present application claims priority under 35 U.S.C. §119 to Japanese Patent Applications No. 2009-235994 filed Oct. 13, 2009, No. 2010-58843 filed Mar. 16, 2010, and No. 2010-107686 filed Apr. 15, 2010. The contents of these applications are incorporated herein by reference in their entirety.

BACKGROUND OF THE INVENTION

1. Field of the Invention

The present invention relates to a rotating electric machine system.

2. Discussion of the Background

Rotating electric machine apparatus, such as an electric generator for electromagnetically generating electric power by relative rotation of a permanent magnet and an armature, or an electric motor for generating relative rotation between a permanent magnet and an armature by interaction of the permanent magnet and a magnetic field generated by electric current supplied to the armature, are excellent in energy efficiency and have been widely used routinely with development of permanent magnets. However, in both electric motors and electric generators, optimum power is not always obtained in a wide rotational speed range because the amount of magnetic flux supplied from the permanent magnet is constant.

In the case of the electric motor, it will become difficult to control the electric motor in a high-speed rotational region because the back electromotive force (power generation voltage) becomes too high, and therefore, various methods for weakening the field strength as field-weakening control have been proposed. On the other hand, in the case of the electric generator, a constant-voltage electric generator by means of field current control only or a constant-voltage circuit in which the power generation voltage is made to be constant by a semiconductor has been exclusively used so that the power generation voltage is made to be at a predetermined level in a wide rotational-speed range.

In the case of electric motor, field-weakening control by means of phase leading electric current control has been widely adopted, but the energy efficiency and the control range are limited. Attempts have been made to perform the field control in the rotating electric machines by means of a mechanical deviation (For example, U.S. Pat. No. 7,567,006) without sacrificing the high energy efficiency upon the rotating electric machines with the permanent magnet. As the field condition can be maintained in the form of mechanical deviation, a rotating electrical machine can be actualized with high energy efficiency with the energy loss due to field excitation being kept minimum.

The other method for controlling strength of magnetic field to keep the energy loss at minimum is to change a magnetization state of the permanent magnet irreversibly, and technical propositions are made in United States Patent Applications No. 20090236923, No. 20090261774, and No. 20100171385. These proposals constitute a rotor magnetic pole facing an armature in a permanent magnet with high coercivity and a permanent magnet with low coercivity, and are going to change magnetization of the permanent magnet with low coercivity by magnetic field that an armature coil makes. However, the composition where low coercivity magnets are placed close to the armature coil has always possibility that the magnetization of the above-mentioned permanent magnet may be changed due to unforeseeable accidents, and serious concern remains in stability of the system. Moreover, the magnetization change due to high voltage and high current pulse could seriously damage electronic circuits.

SUMMARY OF THE INVENTION

According to one aspect of the present invention, a rotating electric machine system includes a rotor and an armature. The rotor has a rotor plane. The armature has an armature plane facing the rotor plane and is relatively rotatable with respect to the rotor. The rotor includes magnetic salient poles in a circumferential direction on the rotor plane. Adjacent magnetic salient poles are magnetized in different polarities from each other by a permanent magnet arranged in the magnetic salient pole and or by a permanent magnet arranged between the magnetic salient poles. The armature includes magnetic teeth in the circumferential direction on the armature plane, and armature coils wound around the magnetic teeth. A control magnet is arranged in an inside part of at least one of the adjacent magnetic salient poles in circumferential direction that is away from the armature. An excitation flux path member and an excitation coil are provided. The excitation coil is placed so as to generate an excitation flux collectively in a magnetic flux path including the excitation flux path member, the armature, and the rotor. Product of a magnetization direction length and coercivity is set up so that a magnetization state of the control magnet is not changed only depending on a magnetic flux from the armature coils. The rotating electric machine is constituted so that the magnetization state of the control magnet where the magnetic flux by the armature coils and the excitation flux flow in a same direction is changed irreversibly. An amount of the magnetic flux flowing through the armature coils is controlled by changing the magnetization state of the control magnet in accordance with an output of the rotating electric machine system so that the output is optimized According to another aspect of the present invention, a method is for controlling a magnetic flux amount for a rotating electric machine system. The rotating electric machine system includes a rotor and an armature. The rotor has a rotor plane. The armature has an armature plane facing the rotor plane and is relatively rotatable with respect to the rotor. The rotor includes magnetic salient poles in a circumferential direction on the rotor plane. Adjacent magnetic salient poles are magnetized in different polarities from each other by a permanent magnet arranged in the magnetic salient pole and or by a permanent magnet arranged between the magnetic salient poles. The armature includes armature coils in a circumferential direction on the armature plane facing the rotor. The method includes arranging a control magnet in an inside part of at least one of the adjacent magnetic salient poles in a circumferential direction that is away from the armature. An excitation flux path member and an excitation coil are provided. The excitation coil is placed so as to generate an excitation flux collectively in a magnetic flux path including the armature and the rotor. Product of a magnetization direction length and coercivity is set up so that a magnetization state of the control magnet is not changed only depending on a magnetic flux from the armature coil. The rotating electric machine is constituted so that the magnetization state of the control magnet where the excitation flux and the magnetic flux by the armature coils flow in a same direction is changed irreversibly. Current is supplied to the excitation coil and the armature coils. The control magnet magnetization is changed irreversibly to control an amount of the magnetic flux flowing through the armature.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 13A shows the state that magnet elements 131, 132, 133 are the first magnetization. FIG. 13B shows the state that the magnet elements 131, 132 are the first magnetization and the magnet element 133 is the second magnetization. FIG. 13C shows the state that the magnet element 131 is the first magnetization and the magnet elements 132, 133 are the second magnetization.

FIG. 13D shows the state that the magnet elements 131, 132, 133 are the second magnetization.

DESCRIPTION OF THE EMBODIMENTS

Figure 1:
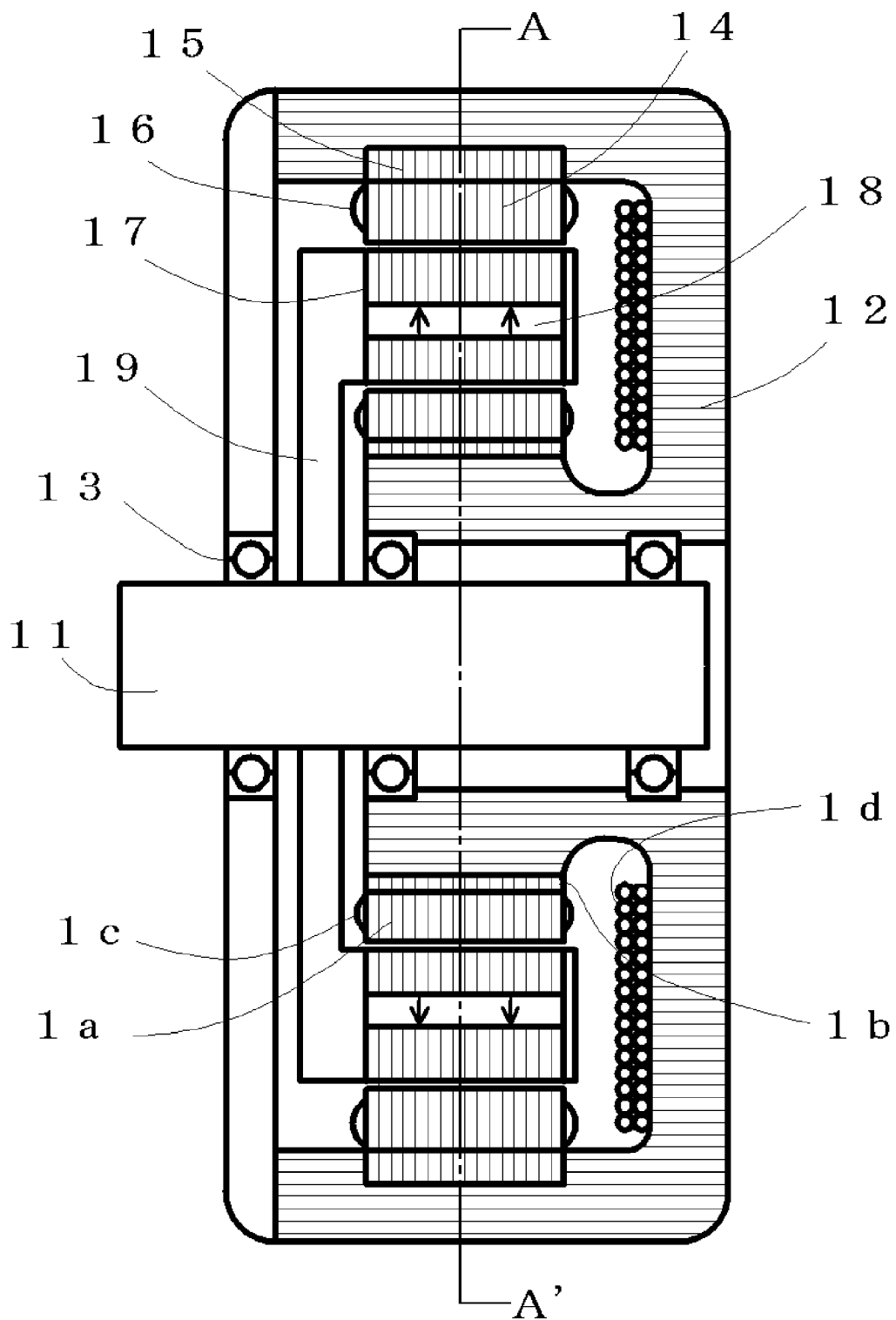
FIG. 1 is a longitudinal sectional view of a rotating electric machine apparatus according to a first embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The rotating electric machine system according to a first embodiment of the present invention will be explained by using FIGS. 1 to 6. The first embodiment is a rotating electric machine system of radial gap structure, and an excitation coil is arranged to go around an axis.

FIG. 1 shows a longitudinal sectional view of the embodiment of the present invention applied to a rotating electric machine apparatus having a radial gap structure, a rotational shaft 11 is supported rotatably by a housing 12 through bearings 13, and a first armature, a rotor 17, and a second armature are sequentially arranged from outer side to inner side. An outer side and an inner side of the rotor 17 are opposed to the first armature and the second armature respectively, a number 18 indicates a control magnet arranged between a surface magnetic pole part of the outer side and a surface magnetic pole part of the inner side, and a number 19 indicates a rotor support. The control magnet 18 is arranged in the location within rotor 17 away from the magnetic teeth in the first armature and the second armature. An arrow in the control magnet 18 indicates direction of magnetization.

The first armature and the second armature oppose to the rotor 17 respectively, and are fixed to the housing 12. The first armature has magnetic teeth 14 extending radially from a cylindrical magnetic yoke 15, and an armature coil 16 wound around the magnetic teeth 14. The second armature has magnetic teeth 1a extending radially from a cylindrical magnetic yoke 1b, and an armature coil 1c wound around the magnetic teeth 1a.

The housing 12 consists of soft iron, is equivalent to an excitation flux path member, and combines magnetically the cylindrical magnetic yoke 15 and the cylindrical magnetic yoke 1b. A excitation coil 1d is arranged so that excitation flux may be generated in a magnetic flux path including the cylindrical magnetic yoke 15, the magnetic teeth 14, the rotor 17, the magnetic teeth 1a, the cylindrical magnetic yoke 1b and the housing 12.

Figure 2:
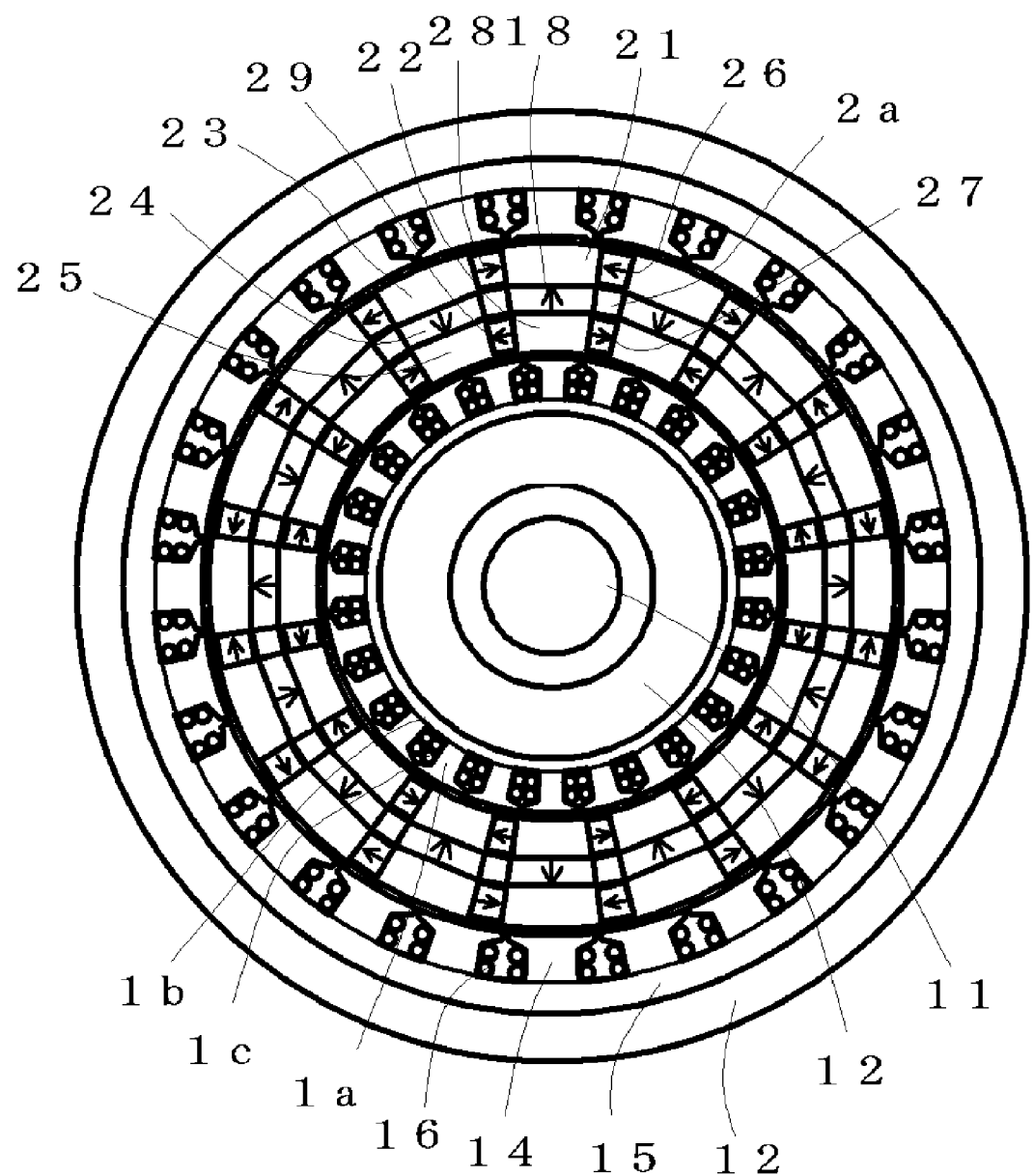
FIG. 2 is a sectional view showing an armature and a rotor of the rotating electric machine apparatus shown in FIG. 1.

FIG. 2 illustrates a sectional view of the armature and the rotor along A-A' of FIG. 1, and some of component parts are appended with numbers for explaining the reciprocal relation. A magnetic salient pole and a permanent magnet are arranged alternately in circumferential direction in the inner side and the outer side of the surface magnetic pole part of the rotor 17. The magnetic salient pole in the inner side and the magnetic salient pole the outer side are aligned in the radial direction. In the outer side of the surface magnetic pole part, adjacent magnetic salient poles are represented by numbers 21, 23, and adjacent permanent magnets are represented by numbers 26, 28. Similarly, in the inner side of the surface magnetic pole part, adjacent magnetic salient poles are represented by numbers 22, 25, and adjacent permanent magnets are represented by numbers 27, 29. In addition, the adjacent permanent magnets are arranged in different magnetization direction each other so that the magnetic salient poles 21, 22 aligned radially are magnetized in same direction, the magnetic salient poles 23, 25 aligned radially are magnetized in same direction, the magnetic salient poles 21, 23 aligned circumferentially are magnetized in different direction, and the magnetic salient poles 22, 25 aligned circumferentially are magnetized in different direction. For example the permanent magnets 26 and 27, the permanent magnets 28 and 29, the permanent magnets 26 and 28, the permanent magnets 27 and have magnetization in opposite direction each other, respectively. Number 2a indicates non-magnetic members arranged between the permanent magnets 26 and 27, between the permanent magnets 28 and 29.

The control magnet 18 with radial direction magnetization is arranged between the magnetic salient poles 21, 22, and the control magnet 24 with radial direction magnetization is arranged between the magnetic salient poles 23, 25. Magnetization directions of the control magnets 18 and 24 adjacent circumferentially are set up inversely each other. The magnetization state of the control magnets 18 and 24 is changed, and flux amount which leaks from the rotor 17 to the first armature and the second armature is controlled in this embodiment. Arrows shown in the permanent magnets 26, 27, 28 and 29, and the control magnets 18 and 24 indicate magnetization direction.

The permanent magnets 26, 27, 28, and 29 are composed of Neodymium magnet with large coercive force as hardly affected by the armature coil at the time of rotation, and the control magnets 18, 24 are composed of Alnico magnet with about 110 km/m coercive force and 8 mm magnetization direction thickness so that magnetization change by synthetic magnetic flux of the excitation coil 1d and the armature coils 16 and 1c may be possible.

The first armature has a plurality of the magnetic teeth 14 extending radially from the cylindrical magnetic yoke fixed to the housing 12, and the armature coil 16 wound around the magnetic teeth 14. The second armature has a plurality of the magnetic teeth 1a extending radially from the cylindrical magnetic yoke 1b, and the armature coil 1c wound around the magnetic teeth 1a. 24 armature coils are arranged to 16 magnetic poles of the rotor, respectively in the first armature and the second armature.

Figure 3:
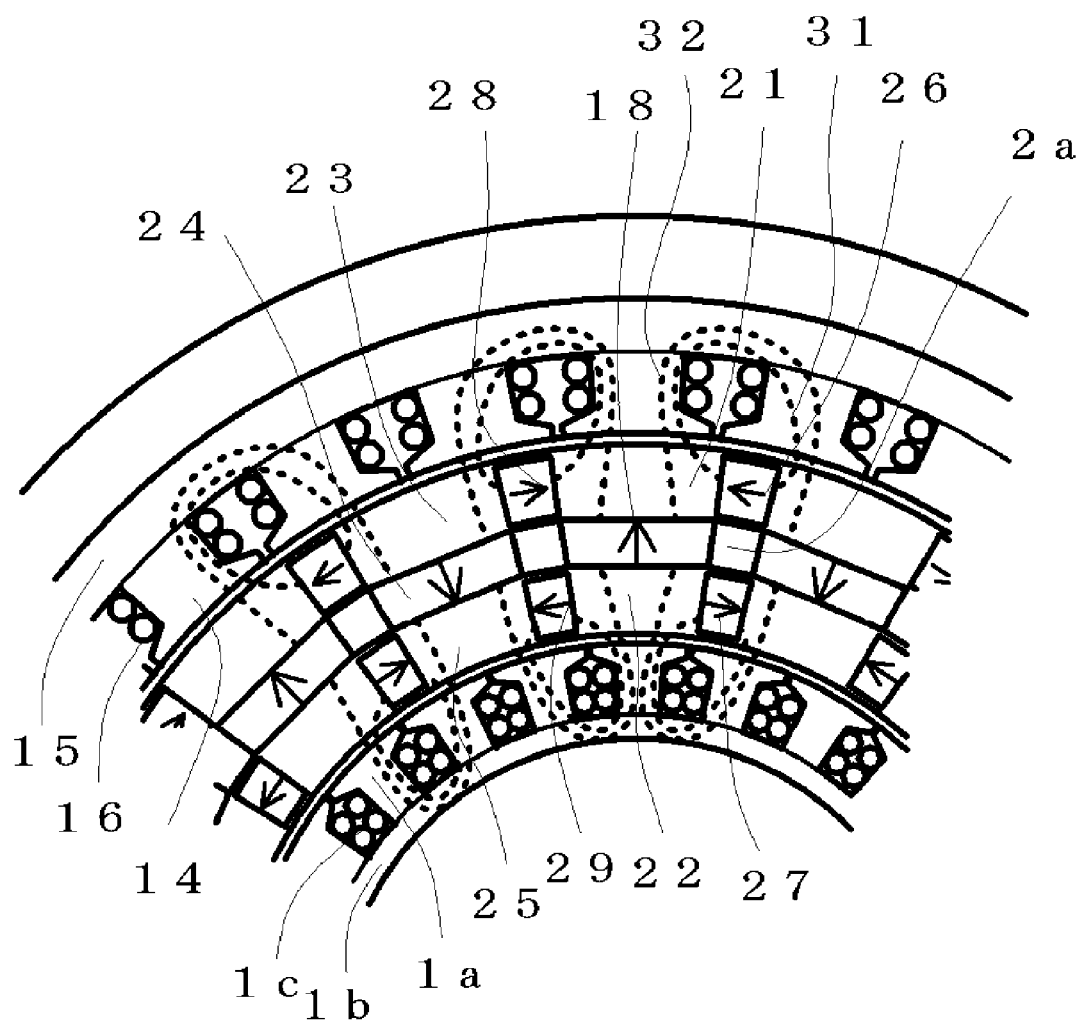
FIG. 3 is showing magnetic flux flow in field strengthening and a magnified sectional view of the armature and the rotor shown in FIG. 2.

FIG. 3 is showing a magnified sectional view of a part of FIG. 2, and magnetic flux flow in field strengthening will be explained. Dotted lines 31 represent magnetic flux coming from the permanent magnets 26, 27, 28, 29. Dotted lines 32 represent magnetic flux coming from the control magnets 18, 24. When magnetic flux 31 from the permanent magnets 26, 27, 28, 29 and magnetic flux 32 from the control magnets 18, 24 flow down the magnetic salient poles 21, 23, 22, 25 in same direction respectively, flux amount through the armature coils 16, 1c is increased as shown in the figure. Therefore, in the control magnet 18, the magnetization in the outside diameter direction corresponds to the first magnetization and the magnetization in the inside diameter direction corresponds to the second magnetization. And in the control magnet 24, the magnetization in the inside diameter direction corresponds to the first magnetization and the magnetization in the outside diameter direction corresponds to the second magnetization.

Figure 4:
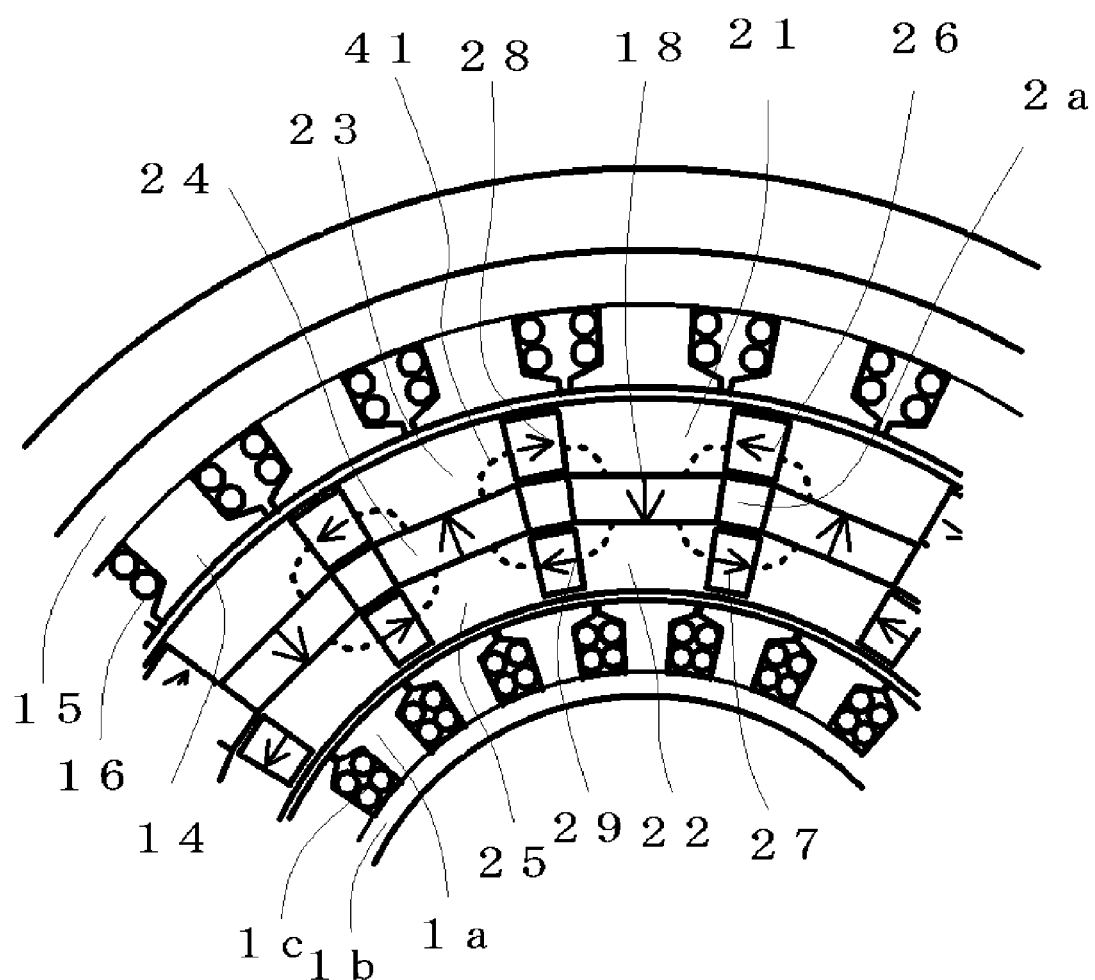
FIG. 4 is showing magnetic flux flow in field weakening and a magnified sectional view of the armature and the rotor shown in FIG. 2.

FIG. 4 indicates the state that magnetization direction of the control magnets 18, 24 is contrary to the state shown in FIG. 3. The control magnet 18, the permanent magnet 29, the control magnet 24, and the permanent magnet 28 constitute closed magnetic flux path, also the control magnet 18, the permanent magnet 27, the control magnet 24, and the permanent magnet 26 constitute closed magnetic flux path, and then flux amount that flows into the armature side is decreased. Dotted line 41 represents magnetic flux which flows through the above closed magnetic flux path, and case shown in FIG. 4 corresponds to the state of field weakening. The magnetic flux amount which flows to the armature side in this state is established by saturation flux density and the magnetic pole area, etc. of the permanent magnets 26, 27, 28, 29, the control magnets 18, 24.

Magnetized state of the control magnets 18, 24 is controlled in one of states indicated by FIG. 3 and FIG. 4, and then flux amount through the armature coil is controlled in this embodiment. The case of FIG. 3 corresponds to the case of field strengthening, the case of FIG. 4 corresponds to the case of field weakening. Composition and principle of operation which control the magnetization state of the control magnets 18 and 24 are explained below.

The housing 12 equivalent to an excitation flux path member combines magnetically the cylindrical magnetic yoke 15 of the first armature and the cylindrical magnetic yoke 1b of the second armature as shown in FIG. 1. The excitation coil 1d is arranged around the rotational shaft 11 and a part of the housing 12 so that excitation flux may be generated in a magnetic flux path including the first armature, the rotor, the second armature and the housing 12. This is the composition in which the excitation coil 1d excites the first armature, the rotor, and the second armature collectively, magnetization change of the control magnets 18 and 24 is explained using FIGS. 5 and 6.

Figure 5:
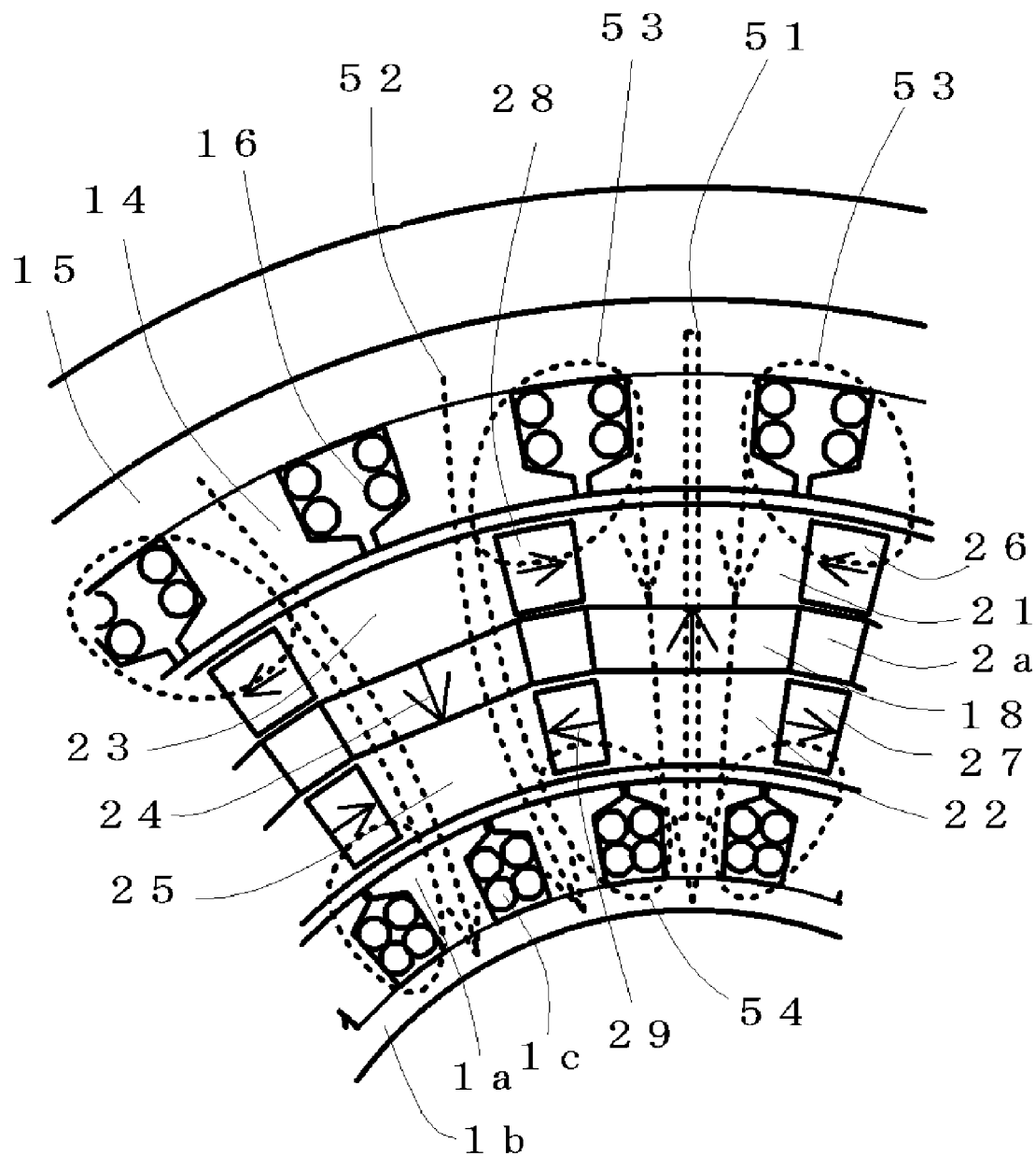
FIG. 5 is showing magnetic flux flow by an armature coil and an excitation coil for field weakening and a magnified sectional view of the armature and the rotor shown in FIG. 2.

FIG. 5 is a figure to explain the principle which changes magnetization of the control magnet 18 from the state indicated in FIG. 3 for field weakening. The excitation coil 1d supplies excitation flux to the rotor collectively so that the flux flows in opposite direction to magnetization direction of the control magnet 18. The excitation flux indicated in dotted line 51 flows through the magnetic salient pole 21, the control magnet 18 and the magnetic salient pole 22 in this order, the excitation flux indicated in dotted line flows through the magnetic salient pole 23, the control magnet 24 and the magnetic salient pole 25 in this order.

When the magnetic teeth 14 and 1a face the magnetic salient poles 21 and 22, respectively, electric current which generates magnetic flux flowing within the magnetic salient poles 21, 22 to the same direction as the excitation flux 51 is supplied to the armature coils 16, 1c. Magnetic flux generated by the armature coils 16, 1c is represented by dotted lines 53, 54. The flux 53 is flowing in opposite direction to magnetization direction of the permanent magnets 26, 28 and is hard to flow within them, the flux 54 is flowing in opposite direction to magnetization direction of the permanent magnets 27, 29 and is hard to flow within them. Therefore, the flux 53 and the flux 54 tend to flow through the control magnet 18 in same direction as the flux 51. Moreover, the flux 52 and the flux 53, 54 flow in opposite direction each other in the magnetic salient poles 23, 25, and the control magnet 24. These flux 52 and the flux 53, 54 are offset each other, and there is little magnetic flux to flow through the control magnet 24. Therefore the flux by the excitation coil 1d and the armature coils 16, 1c is concentrated on the control magnet 18, and magnetization thereof is reversed.

When the rotor is driven to rotate, magnetic flux 53 and 54 are added from the armature coils 16 and 1c to the rotor, but the permanent magnets 26, 27, 28, 29 are composed mainly by neodymium magnet with large coercivity, magnetization state thereof is unaffected. Also, the product of the coercivity and the magnetization direction length, magnetization easiness of the control magnets 18 and 24, is set so that magnetization state thereof is not changed by only the flux 53 and 54 or the flux 51 and 52, the magnetization state of the control magnets 18 and 24 is maintained stably.

Thus the flux by the excitation coil 1d and the armature coils 16, 1c is concentrated on the control magnet 18, and magnetization thereof is reversed. Magnetization of the control magnet 24 will be changed following the magnetization change of the control magnet 18. The direction of the current supplied to the magnetization coil 1d is changed, and magnetization of the control magnet 24 is changed at the same above-mentioned step as magnetization change of the control magnet 18.

Figure 6:
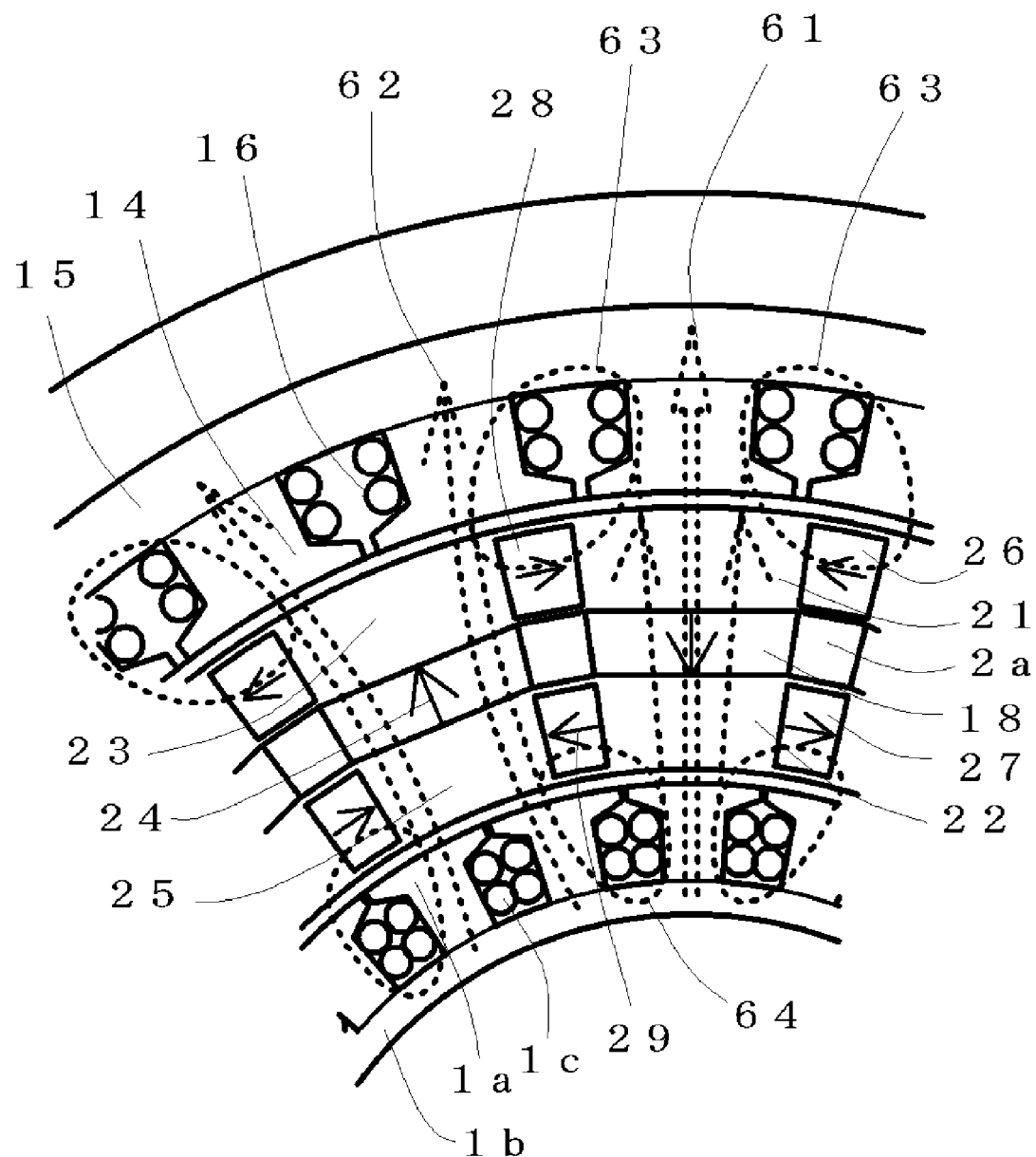
FIG. 6 is showing magnetic flux flow by the armature coil and the excitation coil for field strengthening and a magnified sectional view of the armature and the rotor shown in FIG. 2.

FIG. 6 is a figure to explain the principle which changes magnetization of the control magnet 18 from the state indicated in FIG. 4 for field strengthening. Step to change magnetization of the control magnet 18 from state of field weakening toward state of field strengthening is accompanied with difficulty a little. That is, magnetic flux of the armature coils 16 and 1c is short-circuited with the permanent magnets 26, 28, 27, and 29 arranged between magnetic salient poles, it becomes difficult to concentrate magnetic flux on the control magnet 18. In the embodiment of the present invention, the excitation flux from the excitation coil 1d and the magnetic flux from the armature coils 16, 1c are superimposed each other, magnetic flux is concentrated on the control magnet 18 by saturating the permanent magnets 26, 28, 27, and 29 magnetically.

The excitation coil 1d supplies excitation flux to the rotor collectively so that the flux flows in opposite direction to magnetization direction of the control magnet 18. The excitation flux indicated in dotted line 61 flows through the magnetic salient pole 22, the control magnet 18 and the magnetic salient pole 21 in this order, the excitation flux indicated in dotted line 62 flows through the magnetic salient pole 25, the control magnet 24 and the magnetic salient pole 23 in this order.

When the magnetic teeth 14 and 1a face magnetic salient poles 21 and 22, respectively, electric current which generates magnetic flux flowing within the magnetic salient poles 21, 22 to the same direction as the excitation flux 61 is supplied to the armature coils 16, 1c. Magnetic flux generated by the armature coils 16, 1c is represented by dotted lines 63, 64. The flux 63 is flowing in same direction to magnetization direction of the permanent magnets 26, 28 and tends to flow within them, the flux 64 is flowing in same direction to magnetization direction of the permanent magnets 27, 29 and is easy to flow within them. Therefore, the flux 63 and the flux 64 are hard to be concentrated through the control magnet 18. The flux 62 and the flux 63, 64 flow in opposite direction each other in the magnetic salient poles 23, 25, and the control magnet 24. These flux 62 and the flux 63, 64 are offset each other, and there is little magnetic flux to flow through the control magnet 24. Therefore, current supplied to the armature coils 16 and 1c is made enough large so that the permanent magnets 26, 28, 27, and 29 may be magnetically saturated by the magnetic flux 63 and 64, the flux by the excitation coil 1d and the armature coils 16, 1c is concentrated on the control magnet 18, and magnetization thereof is reversed.

Magnetization of the control magnet 24 will be changed following the magnetization change of the control magnet 18. The direction of the current supplied to the excitation coil 1d is changed, and magnetization of the control magnet 24 is changed at the same above-mentioned step as magnetization change of the control magnet 18.

The control magnets 18, 24 are arranged in adjacent magnetic salient poles each other in this embodiment, so those magnetization change can be ended one by one in a short time, but time for the magnetization change is influenced by switchover time of the electric current supplied to the excitation coil 1d. Since the excitation flux by the excitation coil 1d flows through the housing 12, narrow pulse-like flux with high frequency component is hard to flow. Furthermore, when making winding number of the excitation coil 1d much, inductance thereof becomes large, and switching current is time-consuming. Winding number of the excitation coil 1d is reduced, narrow pulse-like flux is assumed to flow easily by composing inner parts of the housing 12 by powdered core, magnetization change of the control magnet can be terminated in a short time.

In order to make understanding easy, flux from the permanent magnet, the control magnet, the armature coil, and the excitation coil are represented by different lines respectively in FIGS. 3-6. The flux is superimposed as long as magnetic saturation is not caused in the magnetic substance. These figures have been shown to be a model in order to facilitate understanding.

In the rotating electric machine of this embodiment, the permanent magnet between the magnetic salient poles is desirable to apply neodymium magnet since it is close to the armature. The control magnet is arranged away from the armature, and the product of magnetization direction length and coercivity is set within range where the magnetization can be changed by synthetic flux of the excitation coil and the armature coil. Magnetization change of the control magnet is difficult only by the flux from the armature coil, but becomes possible by merging with the excitation flux from the excitation coil, the magnetization state of the control magnet is maintained stably. An AlNiCo magnet, the neodymium magnet and other magnets are practicable for the control magnet, and they are selected according to each specification of the excitation coil and the armature coil and also the specification of the power supply.

In the above, the composition of the first embodiment was shown using FIGS. 1-6, and the principle of magnetization change of the control magnet was explained for changing flux amount through the armature coil. Although the rotating electric machine shown in this embodiment operates as field controllable electric motor, or field controllable dynamo, the composition except being related to field control is the same as conventional rotating electric machine, and explanation of operation as an electric motor or a dynamo is omitted.

In this embodiment, armature coils in same phase are constituted to face magnetic salient poles having the control magnet 18 for magnetization reversal at the same time, but the composition of the present invention is not limited to this. The excitation coil supplies the excitation flux to the armature and the rotor collectively, the armature coil controls flow of the excitation flux and makes the magnetic flux concentrate on the control magnet to which the magnetization is changed. Changing the configuration of the armature coils along gist of the present invention is of course possible.

Moreover, this embodiment is a radial gap structure to have two armatures, and it is also possible to consider it as an axial gap structure having two armatures. In that case, the first armature, the rotor, and the second armature are formed in disk-like shape, and they are stationed by this order axially. Exciting coil is placed on the inner or outer side of the rotor to orbit the axis of rotation.

The rotating electric machine system according to a second embodiment of the present invention will be explained by using FIGS. 7 to 13. The second embodiment is a rotating electric machine system of radial gap structure, and a control magnet is constituted as parallel connection of magnet elements with different magnetization easiness.

Figure 7:
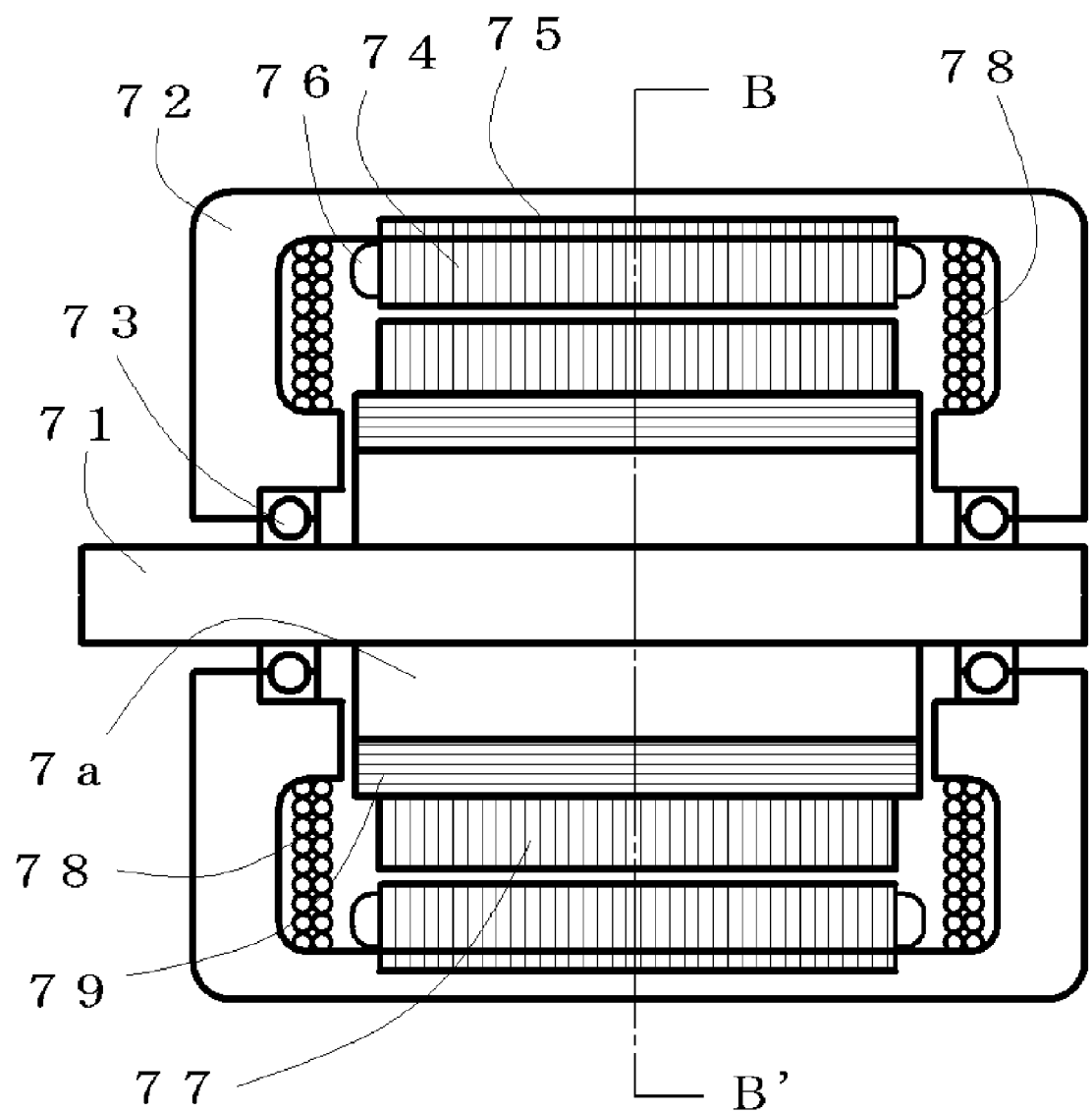
FIG. 7 is a longitudinal sectional view of a rotating electric machine apparatus according to a second embodiment of the present invention.

FIG. 7 shows a longitudinal sectional view of an embodiment of the present invention applied to a rotating electric machine apparatus having a radial gap structure, a rotational shaft 71 is supported rotatably by a housing 72 through bearings 73. An armature has magnetic teeth 74 extending radially from a cylindrical magnetic yoke 75 fixed to the housing 72, and an armature coil 76 wound around the magnetic teeth 74. A rotor has a surface magnetic pole part 77, a cylindrical magnetic core 79, and a rotor support 7a, and rotates with the rotational shaft 71. The housing 72 consists of the magnetic material mainly composed of soft iron, and faces both ends of the cylindrical magnetic core 79 through small gap. An excitation coil 78 is arranged around the rotational shaft 71 so that excitation flux may be generated in a magnetic flux path including the housing 72, the cylindrical magnetic core 79, the surface magnetic pole part 77, the magnetic teeth 74 and the cylindrical magnetic yoke 75.

Figure 8:
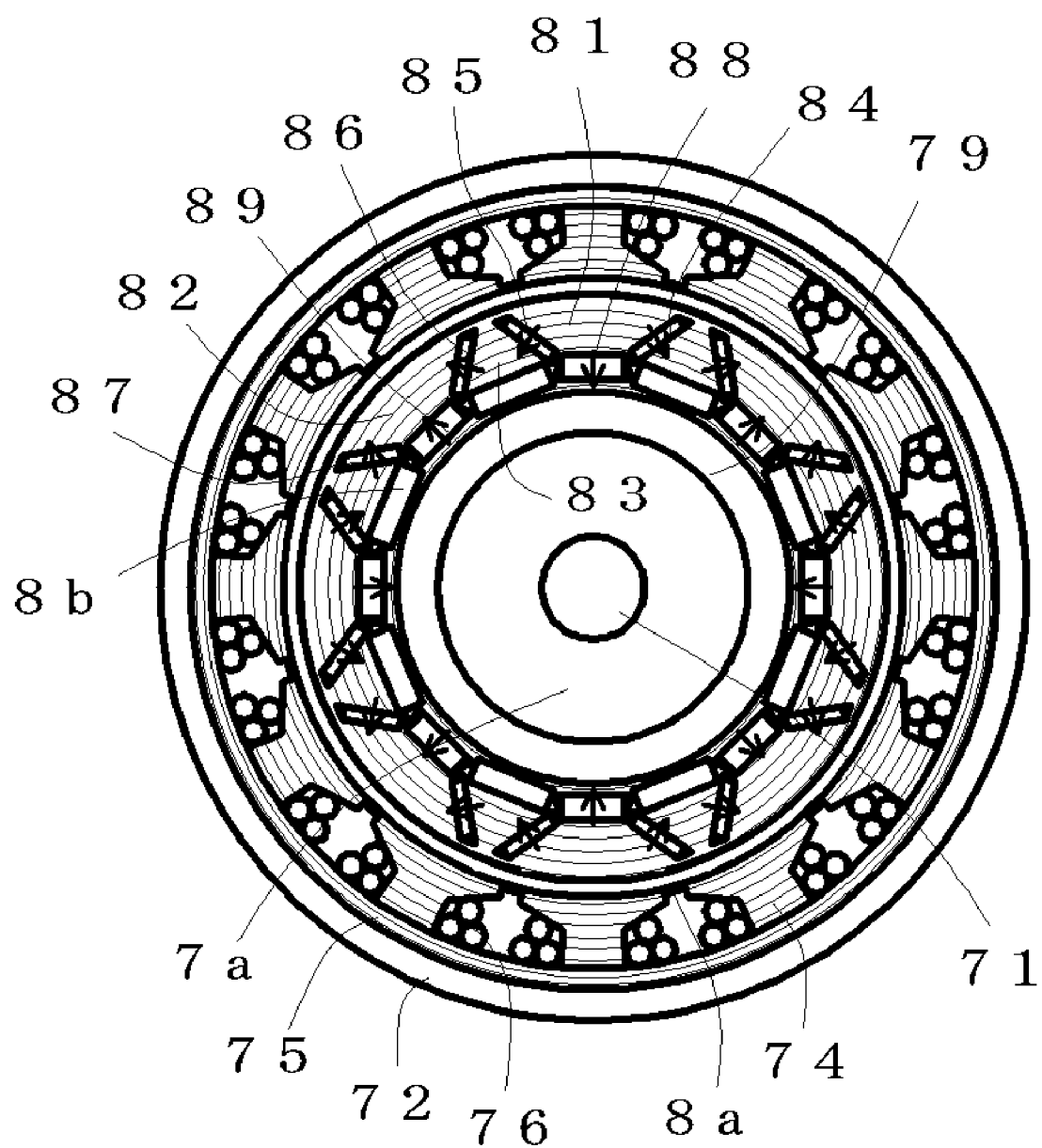
FIG. 8 is a sectional view showing an armature and a rotor of the rotating electric machine apparatus shown in FIG. 7.

FIG. 8 illustrates a sectional view of the armature and the rotor along B-B' of FIG. 7, and some of component parts are appended with numbers for explaining the reciprocal relation. The surface magnetic pole part 77 has composition that a magnetic substrate is sectioned by permanent magnet assemblies in a circumferential direction. A combination of an intermediate magnetic salient pole 83 and permanent magnet plates 85, 86 having same magnetization direction disposed at both sides of the intermediate magnetic salient pole 83 serves as the permanent magnet assembly. That is, the surface magnetic pole part 77 of the rotor is composed of the permanent magnet assembly and a magnetic salient pole alternately arranged circumferentially. And each magnetization direction of the adjacent permanent magnet assemblies is inversely arranged so that the adjacent magnetic salient poles 81, 82 are magnetized in different polarities from each other. The disposition shape of the permanent magnet plates that are disposed at both circumferential sides of the magnetic salient poles 81, 82 looks like V-letter, a crossing angle of the V-letter shape is arranged at a suitable value for a flux barrier. Arrows appended in the permanent magnet plates 84, 85, 86, 87 show magnetization directions that are perpendicular to the permanent magnet plates 84, 85, 86, 87 face.

A control magnet 88 is arranged on an inner side of the magnetic salient pole 81, and a control magnet 89 is arranged on an inner side of the magnetic salient pole 82. Any control magnets 88, 89 are positioned well away from the magnetic teeth 74, and arrows within the control magnets 88, 89 indicate magnetization direction. The magnet plates 84, 85 and the control magnet 88 magnetize the magnetic salient pole in same polarity, and the magnet plates 86, 87 and the control magnet 89 magnetize the magnetic salient pole 82 in same polarity. The permanent magnet assembly is composed by the intermediate magnetic salient pole 83 and the permanent magnet plates 85 and 86, and non-magnetic member 8b is arranged on inner side of the permanent magnet assembly so that flux from the excitation coil 78 should not flow to the armature side through the intermediate magnetic salient pole 83. Furthermore, the control magnets 88 and 89 are composed respectively as parallel connection of magnet elements with different thickness arranged axially repeatedly, and composition thereof is shown in FIG. 13.

The armature is composed of the cylindrical magnetic yoke 75 fixed to the housing 72, a plurality of magnetic teeth 74 extending radially from the cylindrical magnetic yoke 75, and the armature coils 76 wound around the magnetic teeth 74. Saturable magnetic junctions 8a that are short in the radial direction are provided between the contiguous edges of the magnetic teeth 74. The magnetic teeth 74 and the saturable magnetic junctions 8a are punched out of a silicon steel plate by a predetermined die and stacked and wound with the armature coils 76, and then, combined with the cylindrical magnetic yoke 75 composed of powder magnetic core, and thereby the armature is produced.

The saturable magnetic junctions 8a improve the support strength of the magnetic teeth 74 integrally with the magnetic teeth 74, and suppress unnecessary vibration of the magnetic teeth 74. The radial length of each of the saturable magnetic junctions 8a is set to be short, and thereby, the shape thereof that is easy to be magnetically saturated. Therefore, the junctions 8a are easy to be saturated with the magnetic flux generated by the armature coils 76 or the magnetic flux from the permanent magnet, and in such a case, the shorted amount of the magnetic flux generated by the armature coils 76 and the magnetic flux is made to be small. When a current is supplied to the armature coils 76, the saturable magnetic junctions 8a are magnetically saturated and then begin to leak the magnetic flux, along with time passing. The border of the effective non-magnetic portions appearing in the saturable magnetic junctions 8a that are magnetically saturated is not clear, and therefore, the distribution of the leaking magnetic flux becomes mild, and also in this point, the saturable magnetic junctions 8a contribute to the suppression of vibration with moderating time change of the force applied to the magnetic teeth 76.

The control magnets 88 and 89 are composed respectively as parallel connection of magnet elements with different magnetization easiness in this embodiment, and FIG. 13 indicates longitudinal section for the control magnet 88 arranged within the magnetic salient pole 81. The control magnet 88 is constituted by magnet elements 131, 132, 133 with different magnetic direction length, and the magnet elements 131, 132, 133 are repeatedly located in this order axially, and are connected in parallel by magnetic material. When magnetic field is added with the armature coil 76 and the excitation coil 78, magnetic potential difference (magnetomotive force) between magnetic members which sandwiches the magnet elements 131, 132, 133 up and down is almost same in axial direction, and magnetic field intensity equivalent to the value in which the magnetic potential difference is divided by magnet element length is added in each magnet elements. Therefore, a short magnet element is easy to be magnetized, and a long magnet element is hard to be magnetized. The control magnet 89 is also the same composition, and the magnetization direction is reverse to the control magnet 88.

FIGS. 9, 10, 11 and 12 are magnified sectional views of the armature and the rotor shown in FIG. 8, the flow of the magnetic flux will be explained. In these figures, the armature coil 76 is shown as repeated armature coils 91, 92, and 93 in the armature coils of U-phase, V-phase, and W-phase, respectively. Moreover, in this embodiment, the control magnets 88 and 89 consist of three magnet elements, respectively, and three magnet elements can take different magnetization direction, respectively. The magnetization direction in superior magnet element in number is shown as magnetization direction of the control magnets 88 and 89 respectively in FIGS. 9 and 10.

Figure 9:
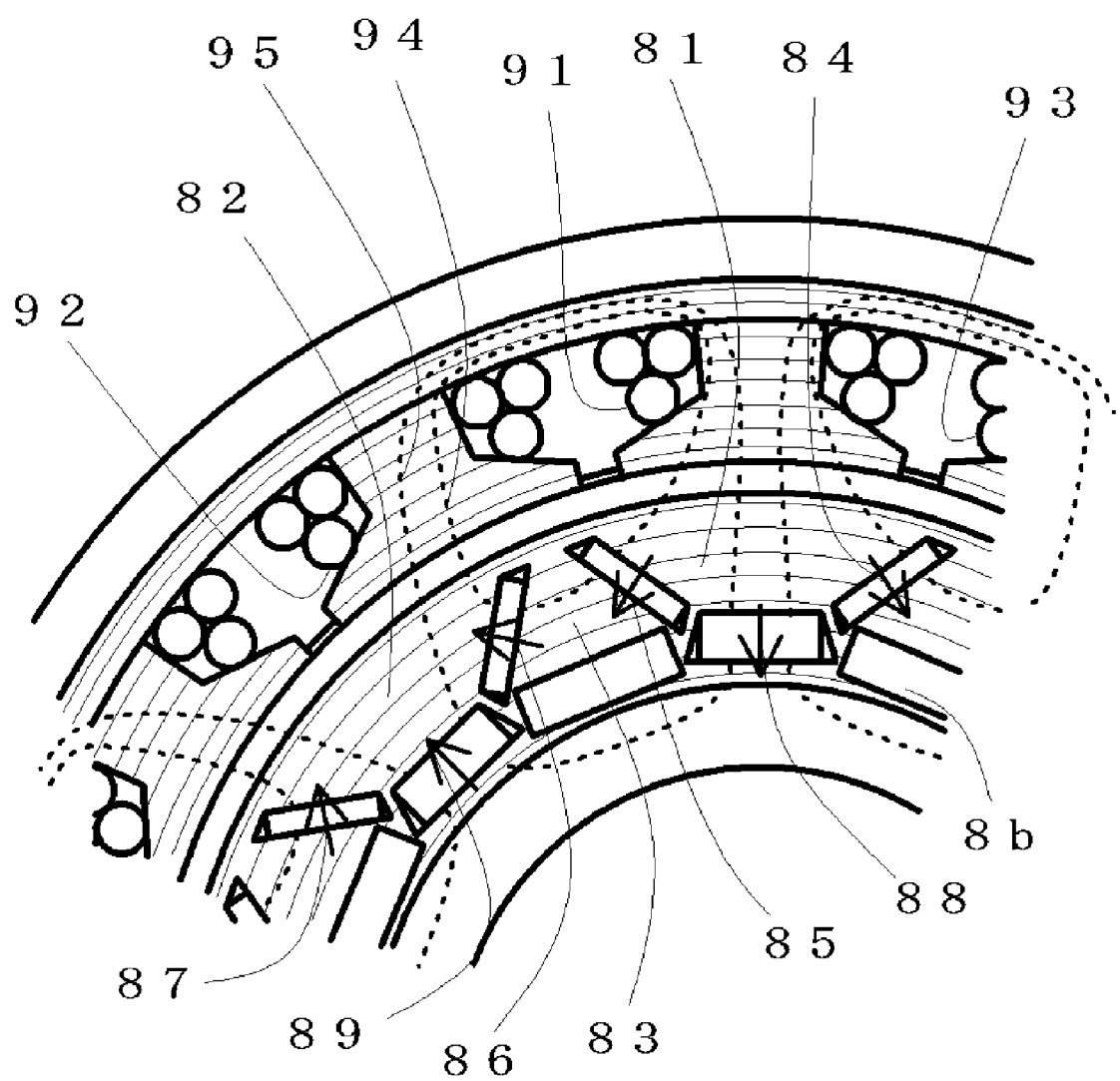
FIG. 9 is showing magnetic flux flow in field strengthening and a magnified sectional view of the armature and the rotor shown in FIG. 8.
Figure 13A:
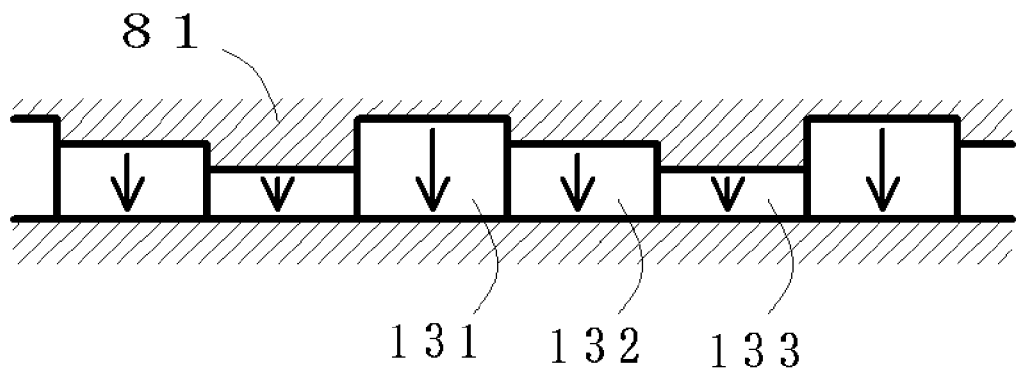
FIGS. 13A, 13B, 13C, and 13D are longitudinal sectional views of a part of a control magnet shown in FIG. 7.
Figure 13B:
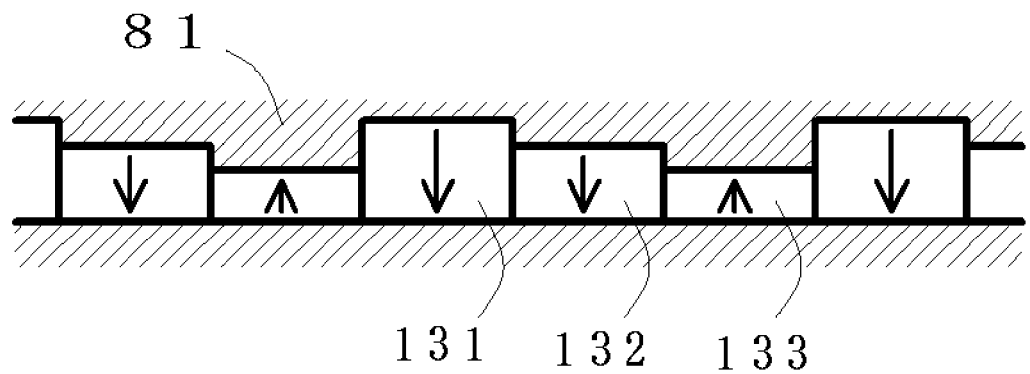

In FIG. 9, dotted lines 94 represent magnetic flux coming from the permanent magnet plates 84, 85, 86, 87. Dotted lines 95 represent magnetic flux coming from the control magnets 88, 89. The magnetic salient poles 81, 82 are connected each other by narrow magnetic members in the figure, but the narrow magnetic members are saturated easily magnetically, so they can be ignored magnetically. When the permanent magnet plates 84, 85 and the control magnet 88 magnetize the magnetic salient pole 81 in S pole, and the permanent magnet plates 86, 87 and the control magnet 89 magnetize the magnetic salient pole 82 in N pole, flux amount through the armature coil is increased. The state of being magnetization direction of the control magnet 88 in inside diameter direction is equivalent to the state where magnetization direction of two or more magnet elements is inside diameter direction as shown in FIGS. 13A and 13B. In case of the control magnet 88, the magnetization in inside diameter direction corresponds to the first magnetization and the magnetization in outside diameter direction corresponds to the second magnetization. In case of the control magnet 89, the magnetization in outside diameter direction corresponds to the first magnetization and the magnetization in inside diameter direction corresponds to the second magnetization.

Figure 10:
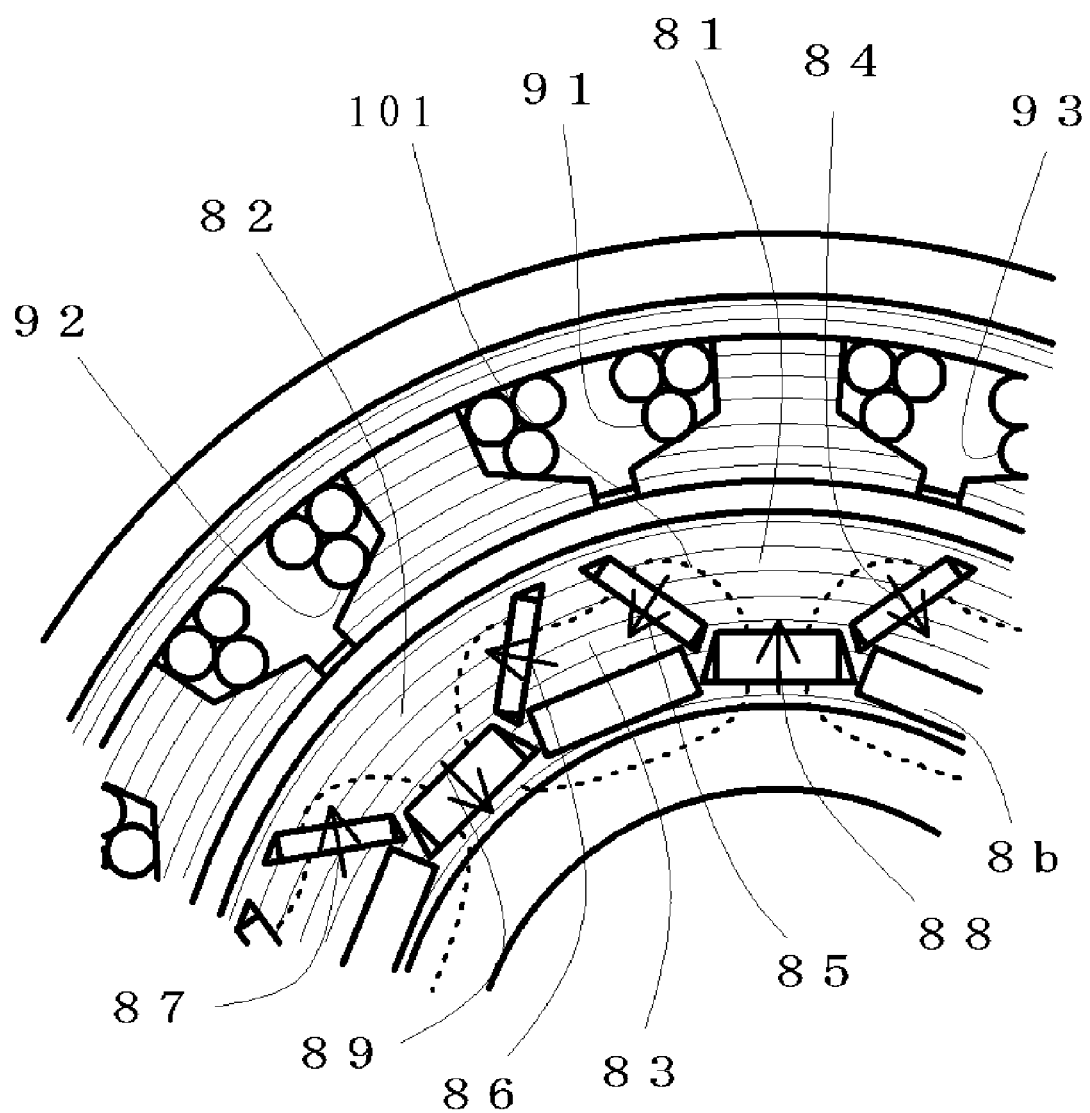
FIG. 10 is showing magnetic flux flow in field weakening and a magnified sectional view of the armature and the rotor shown in FIG. 8.
Figure 13C:
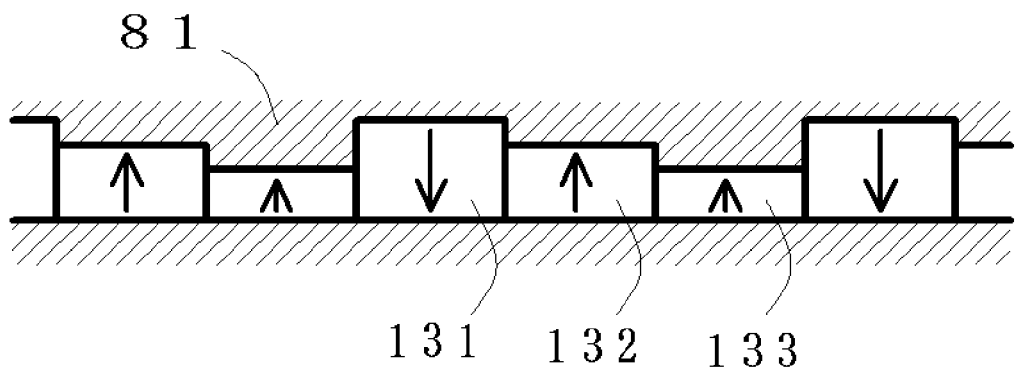
Figure 13D:
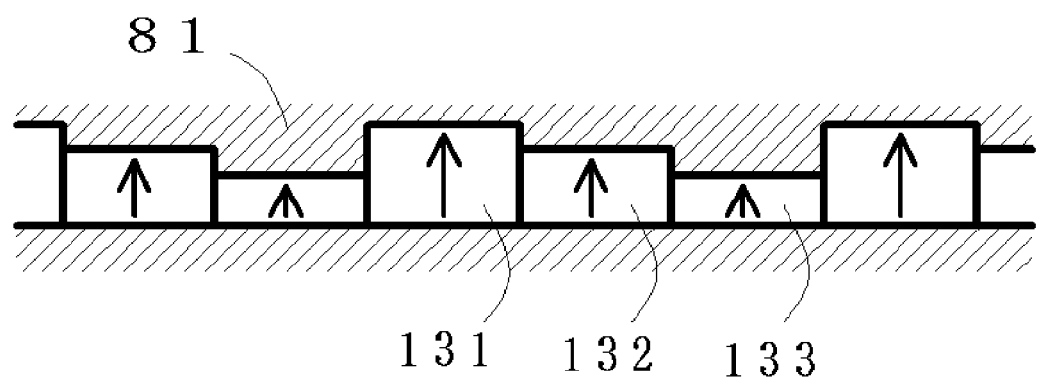

FIG. 10 indicates the state that magnetization direction of the control magnets 88, 89 is contrary to the state shown in FIG. 9. The control magnets 88, 89, and the permanent magnet plates 85, 86 constitute closed magnetic flux path, also the control magnets 88, 89, and the permanent magnet plates 84, 87 constitute closed magnetic flux path, and then flux amount that flows into the armature side is decreased. Dotted line 101 represents magnetic flux which flows through the above closed magnetic flux path, and case shown in FIG. 10 corresponds to the state of field weakening. The magnetic flux amount which flows to the armature side in this state is established by saturation flux density and the magnetic pole area, etc. of the permanent magnet plates 84, 85, 86, 87, the control magnets 88, 89. The state of being magnetization direction of the control magnet 88 in outside diameter direction is equivalent to the state where magnetization direction of two or more magnet elements is outside diameter direction as shown in FIGS. 13C and 13D.

In this embodiment, magnetized states of the control magnets 88 and 89 are changed and flux amount through the armature coil is controlled. Composition and principle of operation which control the magnetization state of the control magnets 88 and 89 are explained below.

The housing 72 equivalent to an excitation flux path member combines magnetically the cylindrical magnetic yoke 75 of the armature and the cylindrical magnetic core 79 as shown in FIG. 7. The excitation coil 78 is arranged so that excitation flux may be generated in a magnetic flux path including the housing 12, the cylindrical magnetic core 79, the surface magnetic pole part 77, the magnetic teeth 74 and the cylindrical magnetic yoke 75. The excitation coil 78 arranged at both ends of the rotor is quite the same composition, and either excitation coil 78 excites the surface magnetic pole part 77 in the same direction. This composition is to supply enough excitation flux equally for long rotating electrical machine equipment, and only single excitation coil is enough in short rotating electrical machine equipment. This is the composition in which the excitation coil 78 excites the armature and the rotor collectively, magnetization change of the control magnets 88 and 89 is explained using FIGS. 11, 12 and 13.

Figure 11:
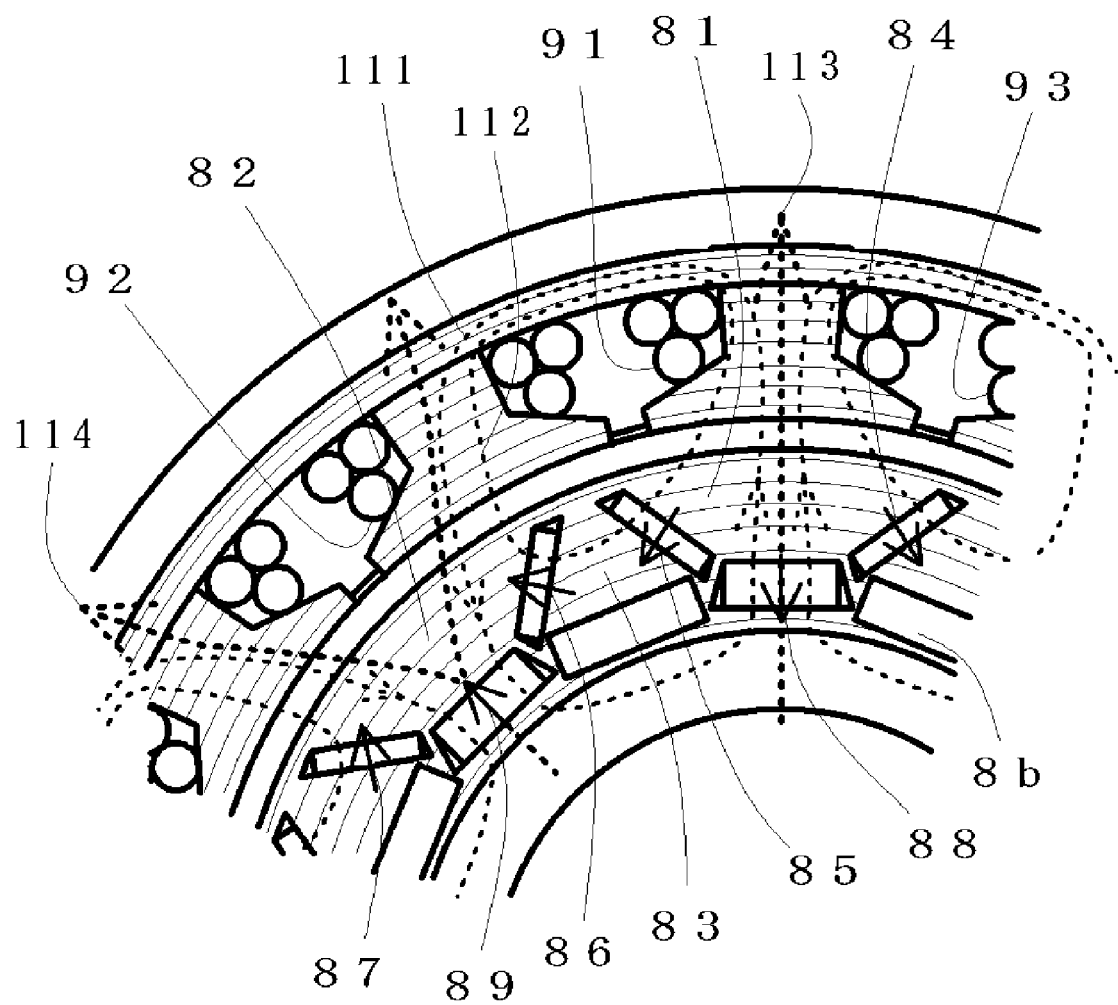
FIG. 11 is showing magnetic flux flow by an armature coil and an excitation coil for field weakening and a magnified sectional view of the armature and the rotor shown in FIG. 8.

FIG. 11 is a figure to explain the principle which changes magnetization of the control magnet 88 for field weakening. The control magnets 88, 89 represent magnet elements with magnetization in the inside diameter direction and magnet elements with magnetization in the outside diameter direction respectively. Field is weakened by increasing number of the magnet elements with magnetization in the outside diameter direction in the control magnet 88, and this is equivalent to change state shown in FIGS. 13A, 13B and 13C to state shown in FIGS. 13B, 13C and 13D, respectively. Magnetic flux flowing through the control magnet 88 in the outer diameter direction is supplied by the excitation coil 78, the armature coils 91, 92, 93, and magnetization of the control magnet 88 is changed toward field weakening side.

The excitation coil 78 supplies excitation flux to the rotor collectively so that the excitation flux flows in direction of outside diameter in the magnetic salient poles 81 and 82. The excitation flux indicated in dotted line 113 flows through the magnetic salient pole 81, the control magnet 88, the excitation flux indicated in dotted line 114 flows through the magnetic salient pole 82, the control magnet 89.

When the magnetic teeth with the armature coil 91 faces the magnetic salient pole 81, electric current which generates magnetic flux flowing within the magnetic salient pole 81 in same direction as the excitation flux 113 is supplied to the armature coil 91, and electric current which generates magnetic flux flowing within the magnetic salient pole 82 in opposite direction as the excitation flux 114 is supplied to the armature coils 92, 93 wound around the magnetic teeth facing the magnetic salient pole 82. Magnetic flux generated by the armature coils 91, 92, 93 is represented by dotted lines 111, 112. Flux 112 indicates magnetic flux which flows in small flux path including the permanent magnets 85, 86, flux 111 indicates magnetic flux which flows in large flux path including the control magnets 88, 89.

The flux 111, 112 are flowing within the magnetic salient pole 81 in same direction as the excitation flux 113 does, the flux 111, 112 are flowing within the magnetic salient pole 82 in opposite direction as the excitation flux 114 does. Therefore, when electric current of the degree that the excitation flux 114 and the flux 111, 112 are offset within the magnetic salient pole 82 is supplied to the armature coils 91, 92, 93, the flux flowing through the control magnet 89 vanishes almost, the flux is concentrated on the control magnet 88, and the magnetization thereof is reversed.

When the rotor is driven to rotate, the flux 111, 112 are added to the rotor from the armature coil. The magnetic flux path for the flux 111 is long compared with the magnetic flux path for the flux 112, so amount of the flux 112 is big compared with amount of the flux 111. However, although direction of the flux 112 is contrary to magnetization direction of the permanent magnets 85 and 86, since the permanent magnets 85 and 86 are constituted from neodymium magnet with large coercivity, magnetizations of them are not influenced. Moreover, since product of coercivity and magnetization direction length which shows magnetization easiness of the control magnets 88 and 89 is set as the degree to which the magnetized state is not changed by the flux 111, so magnetized state of the control magnets 88, 89 is maintained in stable way.

Thus, magnetic flux from the excitation coil 78 and the armature coils 91, 92, and 93 is concentrated on the control magnet 88, and magnetization of the magnet element within the control magnet 88 is changed. The relation between magnetization state of each magnet element and flux amount through the armature coil is explained further, referring to FIG. 13.

The control magnet 88 consists of the magnet elements 131, 132, 133 arranged axially queuing up repeatedly in this order. When flux amount flowing from the permanent magnet plates 84 and 85 of the length corresponding to the magnet elements 131, 132, 133 to the armature side is assumed 1.0, and flux amount flowing from each magnet element to the armature side is assumed 0.25, flux amount flowing to the armature side through the magnetic salient pole 81 corresponds to 1.75 in case of FIG. 13A.

When reducing flux amount flowing into the armature side in FIG. 13A, current is supplied to the armature coils 91, 92, and 93 and the excitation coil 78 so that only the magnetization direction of the magnet element 133 with the smallest magnetization direction length may be reversed. The result is in the state indicated by FIG. 13B, and magnetic flux from the magnet elements 132, 133 is offset each other, and flux amount flowing from the control magnet 88 is 0.25, and flux amount to the armature side through the magnetic salient pole 81 will be 1.25.

In addition, when reducing flux amount flowing into the armature side in FIG. 13B, current is supplied to the armature coils 91, 92, and 93 and the excitation coil 78 so that only the magnetization direction of the magnet element 132 may be reversed and magnetization state of the magnet element 131 may not be affected. The result is in the state indicated by FIG. 13C, and magnetic flux from the control magnet 88 is offset partially with magnetic flux from the permanent magnet plates 84, 85, and flux amount to the armature side through the magnetic salient pole 81 will be 0.75.

When reducing flux amount flowing into the armature side in FIG. 13C, current is supplied to the armature coils 91, 92, and 93 and the excitation coil 78 so that the magnetization direction of the magnet element 131 with the longest magnetization direction length may be reversed. The result is in the state indicated by FIG. 13D, and flux amount to the armature side through the magnetic salient pole 81 will be 0.25.

Figure 12:
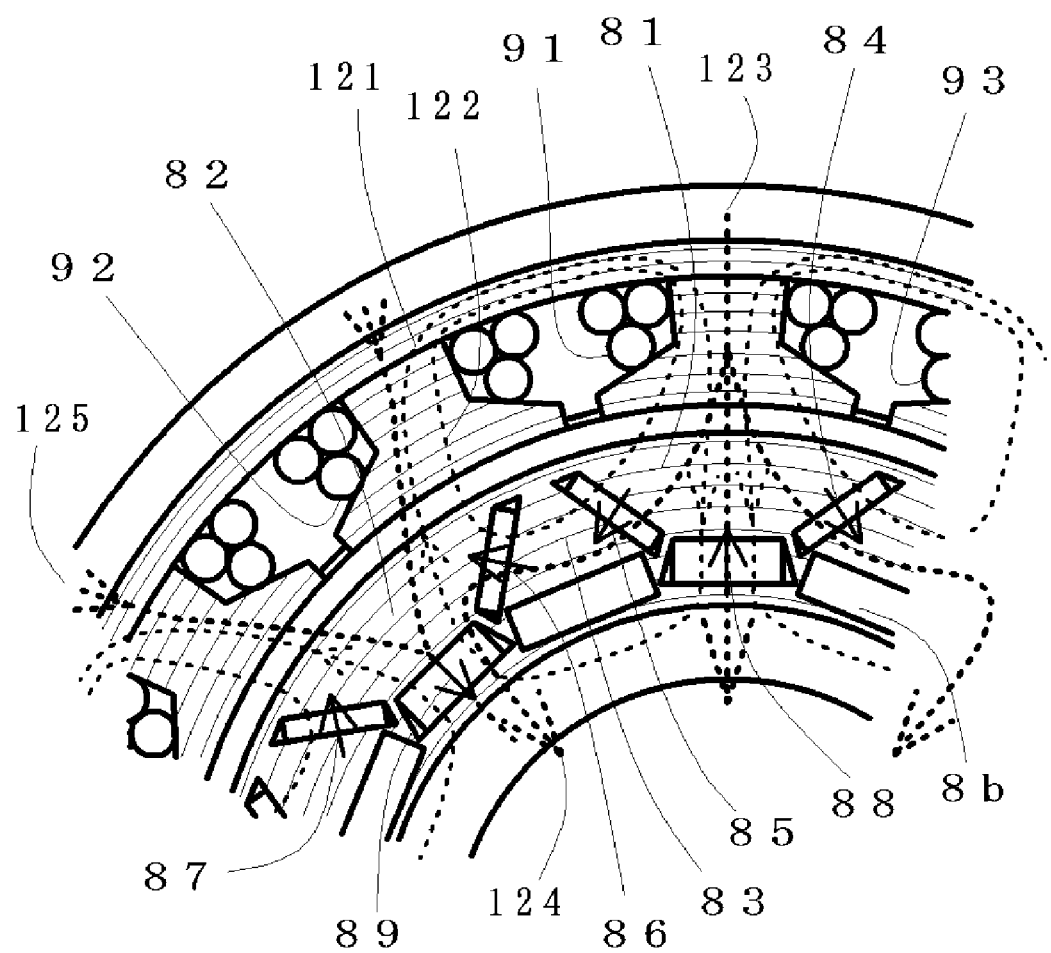
FIG. 12 is showing magnetic flux flow by the armature coil and the excitation coil for field strengthening and a magnified sectional view of the armature and the rotor shown in FIG. 8.

FIG. 12 is a figure to explain the principle which changes magnetization of the control magnet 88 for field strengthening. The control magnets 88, 89 represent magnet elements with magnetization in the outside diameter direction and magnet elements with magnetization in the inside diameter direction respectively. Field is strengthened by increasing number of the magnet elements with magnetization in the inside diameter direction in the control magnet 88. Magnetic flux flowing through the control magnet 88 in the inner diameter direction is supplied by the excitation coil 78, the armature coils 91, 92, 93.

Step to change magnetization of the control magnet from state of field weakening toward state of field strengthening is accompanied with difficulty a little. That is, magnetic flux of the armature coils is short-circuited with the permanent magnet plates arranged between the magnetic salient poles, it becomes difficult to concentrate magnetic flux on the control magnet 88. In the embodiment of the present invention, the excitation flux from the excitation coil and the magnetic flux from the armature coils are superimposed each other, magnetic flux is concentrated on the control magnet 88 by saturating the permanent magnet plates magnetically.

The excitation coil 78 supplies excitation flux to the rotor collectively so that the flux flows in opposite direction to magnetization direction of the control magnet 88. The excitation flux indicated in dotted line 123 flows through the magnetic salient pole 81 and the control magnet 88, the excitation flux indicated in dotted line 125 flows through the magnetic salient pole 82 and the control magnet 89.

When the magnetic teeth with the armature coil 91 faces the magnetic salient pole 81, electric current which generates magnetic flux flowing within the magnetic salient pole 81 in same direction as the excitation flux 123 is supplied to the armature coil 91, and electric current which generates magnetic flux flowing within the magnetic salient pole 82 in opposite direction as the excitation flux 125 is supplied to armature coils 92, 93 wound around the magnetic teeth facing the magnetic salient pole 82. Magnetic flux generated by armature coils 91, 92, 93 is represented by dotted lines 121, 122. Flux 122 indicates magnetic flux which flows in small flux path including the permanent magnets 85, 86, flux 121 indicates magnetic flux which flows in large flux path including the control magnets 88, 89.

The flux 121, 122 are flowing within the magnetic salient pole 81 in same direction as the excitation flux 123 does, the flux 121, 122 are flowing within the magnetic salient pole 82 in opposite direction as the excitation flux 125 does. Therefore, when electric current of the degree that the excitation flux 125 and the flux 121, 122 are offset within the magnetic salient pole 82 is supplied to the armature coils 91, 92, 93, the flux flowing through the magnetic salient pole 82 vanishes almost. However, the direction of the flux 122 flows in the same as the magnetization direction of the permanent magnet plates 85 and 86, it is easy to flow within the permanent magnet plates 85 and 86, and the flux 122 is hard to be concentrated on the control magnet 88. Moreover, since flowing direction of the flux 123 and the magnetization direction of the control magnet 88 are reverse each other, a part of the excitation flux 123 flows through the permanent magnet plates 85 and 86 and the control magnet 89, as shown by the dotted line 124. Sufficient flux is not concentrated on the control magnet 88, and magnetization change of the control magnet 88 is difficult.

Therefore, current supplied to armature coils 91, 92, 93 is made enough large so that the permanent magnet plates 85, 86 may be magnetically saturated by the magnetic flux 122, the flux by the excitation coil 78 and the armature coils 91, 92, 93 is concentrated on the control magnet 88, and magnetization thereof is reversed.

Thus, magnetic flux from the excitation coil 78 and the armature coils 91, 92, and 93 is concentrated on the control magnet 88, and magnetization of the magnet element within the control magnet 88 is changed. The relation between magnetization state of each magnet element and flux amount through the armature coil is explained further, referring to FIG. 13.

Flux amount through the armature coil becomes the fewest in case that the magnetization state of the control magnet 88 is as indicated in FIG. 13D, and corresponds to 0.25. Flux amount through the armature coil is increased by increasing number of the magnet elements with magnetization in the inside diameter direction in the control magnet 88. Current is supplied to the armature coils 91, 92, and 93 and the excitation coil 78 so that only the magnetization direction of the magnet element 133 with the smallest magnetization direction length may be reversed. The result is not indicated in figures, and flux amount to the armature side through the magnetic salient pole 81 will be 0.75.

When increasing flux amount flowing into the armature coil more, current is supplied to the armature coils 91, 92, and 93 and the excitation coil 78 so that only the magnetization direction of the magnet element 132 may be reversed and magnetization state of the magnet element 131 may not be affected. And the magnetization direction of the magnet element 132 is changed toward inside diameter direction. The result is not indicated in figures, and flux amount to the armature side through the magnetic salient pole 81 will be 1.25.

When increasing flux amount flowing into the armature side more, current is supplied to the armature coils 91, 92, and 93 and the excitation coil 78 so that the magnetization direction of the magnet element 131 with the longest magnetization direction length may be reversed. The result is in the state indicated by FIG. 13A, and flux amount to the armature side through the magnetic salient pole 81 will be 1.75.

In the above-mentioned step, enough magnetic flux is not supplied to the control magnet 89, and magnetization of magnet elements within the control magnet 89 is not changed. The control magnet 89 is the same composition as the control magnet 88, but magnetization direction of each magnet element is reverse. Magnetization of the control magnet 89 will be changed by the same step as the magnetization change of the control magnet 88.

In order to make understanding easy, flux from the permanent magnet plates, the control magnet, the armature coil, and the excitation coil are represented by different lines respectively in FIGS. 9-12. The flux is superimposed as long as magnetic saturation is not caused in the magnetic substance. These figures have been shown to be a model in order to facilitate understanding.

In this embodiment, since the magnet elements with different magnetization direction length are put in order axially, flux amount through the armature coil varies along axial direction, back EMF voltage and output torque also fluctuate axially. However, magnetic flux from the control magnet disperses axially, and tends to be equalized, and even if the back EMF voltage fluctuates axially, it is equalized in the armature coil. There is possibility that the output torque fluctuates and raises vibration up axially, but it is canceled by making small the arrangement period of each magnet elements.

Although the control magnet is constituted by parallel connection of magnet elements with different magnetization direction length, composition into which magnetic direction length continuously changes and composition in which the magnet elements with different coercivity is connected in parallel are possible as the control magnet. Moreover, of course, it is also possible to arrange circumferentially within each magnetic salient pole instead of putting each magnet element in order axially.

Moreover, composition which adjusts flux amount flowing through the armature with the excitation coil 78 slightly is also possible by means of making the smallest magnetization direction length of the control magnets 88, 89 different. That is, permeability of permanent magnets is close to that of an air gap, magnetic flux amount coming from the permanent magnet is fixed mostly, so the permanent magnet with big thickness can be applied as the isolation member of bi-directional magnetic flux. When the minimum magnetization direction length of the control magnet 88 sets it as smallness from that of the control magnet 89, the excitation flux from the excitation coil 78 flows through the control magnet 88 much more than the control magnet 89. Flux amount flowing through the armature coil 76 can be adjusted effectively by supplying flux adjustment current of a grade which does not change the magnetization state of the control magnets 88, 89 to the excitation coil 78.

Thus, changing the excitation current supplied to the excitation coil 78 and the armature coils 91, 92, 93, and changing the number of magnet elements corresponding to the first magnetization and the second magnetization in the control magnets 88, 89, flux amount through the armature is controlled. Relationship between the flux amount and the excitation current is set as map data in design phase. However, in mass-production stage of rotating electric machines, precise control of flux amount through the armature may become difficult in presence of variation in component dimension and magnetic property. In such case, the above-mentioned relationship is inspected after assembly of the rotating electric machine, and the above-mentioned map data is corrected.

Furthermore, magnetic substance tends to receive influence by temperature, and when there is also anxious about aging changes, information to correct the above-mentioned map data can be studied by supervising the relationship between the excitation current and the magnetization state during operation of the rotating electric machine. It is difficult to grasp flux amount through the armature directly, but the flux amount is estimated by referring to generated voltage of the armature coils 76.

For example, induced voltage amplitude appearing in armature coils 76 is proportional to flux amount through armature coils 76, and rotating speed. Parameters related to the excitation current are corrected so that amplitude of the excitation current on same conditions is increased in case that amplitude change of induced voltage is smaller than expected value as result of having added the excitation current to the excitation coil 78 and the armature coils 76 (91, 92, 93), and is decreased in case that amplitude change of induced voltage is larger than expected value.

In the above, the composition of the second embodiment was shown using FIGS. 7-13, and the principle of magnetization change of the control magnet was explained for changing flux amount through the armature coil. Although the rotating electric machine shown in this embodiment operates as field controllable electric motor, or field controllable dynamo, the composition except being related to field control is the same as conventional rotating electric machine, and explanation of operation as an electric motor or a dynamo is omitted.

This embodiment is system for optimizing output by controlling the flux amount flowing through the armature, and control method as an electric motor will be explained. A rotating electric machine system in which the rotating electric machine apparatus serves as an electric motor and by which flux amount control is performed to optimize rotational force control will be explained. When the rotational speed becomes larger than a predetermined value and flux amount flowing through the armature is made to be smaller, electric current to reduce number of magnet elements with magnetization direction toward inside diameter in the control magnet 88 is supplied to the excitation coil 78 and the armature coils 91, 92, 93, and magnetization state of the control magnet 88 is changed, and then electric current to reduce number of magnet elements with magnetization direction toward outside diameter in the control magnet 89 is supplied to the excitation coil 78 and the armature coils 91, 92, 93, and magnetization state of the control magnet 89 is changed.

When the rotational speed becomes smaller than a predetermined value and flux amount flowing through the armature is made to be larger, electric current to reduce number of magnet elements with magnetization direction toward outside diameter in the control magnet 88 is supplied to the excitation coil 78 and the armature coils 91, 92, 93, and magnetization state of the control magnet 88 is changed, and then electric current to reduce number of magnet elements with magnetization direction toward inside diameter in the control magnet 89 is supplied to the excitation coil 78 and the armature coils 91, 92, 93, and magnetization state of the control magnet 89 is changed.

A constant-voltage power generation system in which the rotating electric machine apparatus serves as an electric generator and by which the flux amount control is performed to control the power generation voltage to be a predetermined voltage will be explained. When the power generation voltage becomes larger than a predetermined value and flux amount flowing through the armature is made to be smaller, electric current to reduce number of magnet elements with magnetization direction toward inside diameter in the control magnet 88 is supplied to the excitation coil 78 and the armature coils 91, 92, 93, and magnetization state of the control magnet 88 is changed, and then electric current to reduce number of magnet elements with magnetization direction toward outside diameter in the control magnet 89 is supplied to the excitation coil 78 and the armature coils 91, 92, 93, and magnetization state of the control magnet 89 is changed.

When the power generation voltage becomes smaller than a predetermined value and flux amount flowing through the armature is made to be larger, electric current to reduce number of magnet elements with magnetization direction toward outside diameter in the control magnet 88 is supplied to the excitation coil 78 and the armature coils 91, 92, 93, and magnetization state of the control magnet 88 is changed, and then electric current to reduce number of magnet elements with magnetization direction toward inside diameter in the control magnet 89 is supplied to the excitation coil 78 and the armature coils 91, 92, 93, and magnetization state of the control magnet 89 is changed.

The rotating electric machine system according to a third embodiment of the present invention will be explained by using FIG. 14. The third embodiment is a rotating electric machine system that supervises magnetization state of the control magnet in each magnetic salient pole individually, and controls magnetization state of every control magnet in the second embodiment.

The second embodiment changes magnetization state of the control magnets 88 and 89 irreversibly by current supplied to the excitation coil 78 and the armature coil 76, and changes flux amount through the armature coil 76. In that case, the second embodiment can supervise amplitude change of generation voltage which appears in the armature coil 76, in order to know whether magnetization state of the control magnets 88 and 89 was changed correctly, and it can amend the conditions of magnetization state change.

However, the control magnets 88, 89 are arranged in respective magnetic salient poles, and each magnetic characteristics thereof may differ delicately, and there is a possibility that magnetized state of the control magnets 88, 89 is different for every magnetic salient pole. Magnetization state detection of each control magnets 88 and 89 is difficult by the surveillance of induction voltage which appears in the whole armature coil to which the armature coils 76 wound around each magnetic teeth have been connected in series, and exact magnetization state control is difficult.

This embodiment is system that allows to deal with these problems, detect magnetization of the control magnet in each magnetic salient pole, it can modify magnetization condition. In other words, this embodiment has means of monitoring the induced voltage appearing in one armature coil, and detects magnetization state of the control magnet in each magnetic salient pole one by one with rotation of the rotor. When magnetization state change of the control magnet differs from target, current supplied to the armature coil on the occasion of magnetization change of the control magnet is corrected with U-phase, V-phase, W-phase as a unit.

Figure 14:
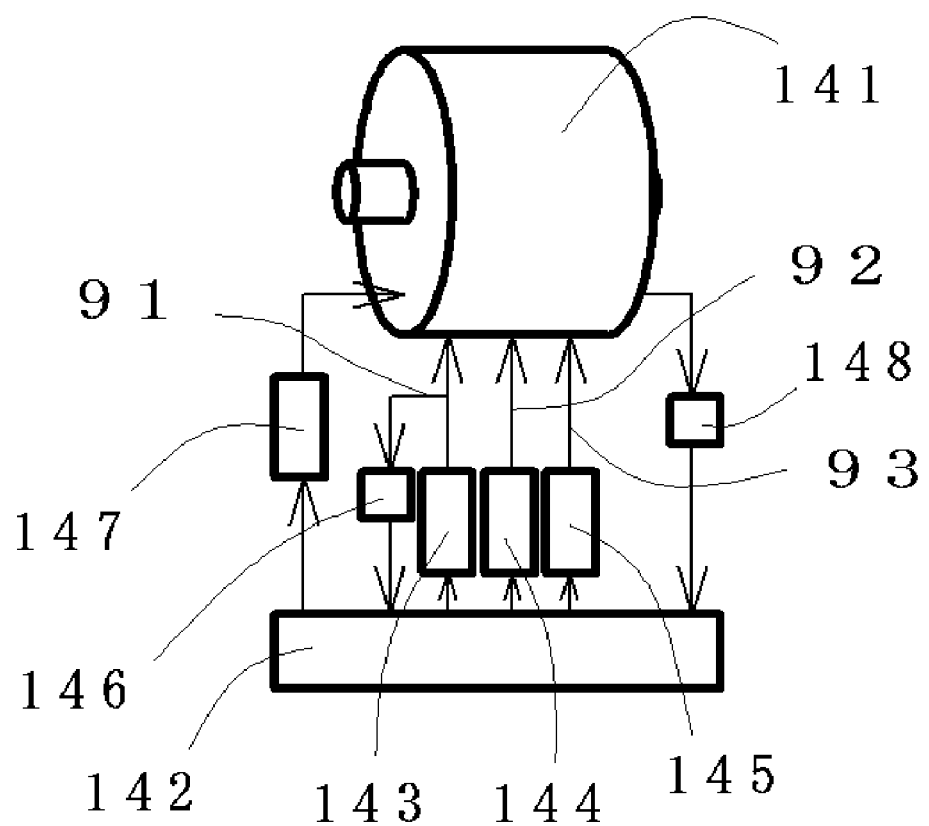
FIG. 14 is a block diagram of a rotating electric machine system according to a third embodiment of the present invention.

FIG. 14 indicates control block diagram for magnetization change in the control magnet in this embodiment, and step of magnetization state control of the control magnet is explained using FIG. 14. Number 141 indicates the rotating electric machine of the second embodiment shown in FIG. 7, number 142 indicates a control part, numbers 143, 144, 145 indicate driving circuits which drive each armature coil 91, 92, 93, number 147 indicates circuitry which supplies current to the excitation coil 78, number 148 indicates a position sensor of the rotor, and number 146 indicates a voltage detector to detect generation voltage appearing in one of armature coil belonging to the armature coil 91.

In this embodiment, magnetization state of the control magnet 88 is changed to field weakening side (to increase number of the magnet elements with magnetization in the outside diameter direction), outline of the steps are described further below with reference to FIG. 11. The excitation coil 78 supplies excitation flux to the rotor collectively so that the flux 113, 114 flow in direction of outside diameter in the magnetic salient poles 81 and 82 respectively. When the magnetic teeth with the armature coil 91 faces the magnetic salient pole 81 according to the output of the position sensor 148, electric current which generates magnetic flux flowing within the magnetic salient pole 81 in same direction as the excitation flux 113 is supplied to the armature coil 91, and electric current which generates magnetic flux flowing within the magnetic salient pole 82 in opposite direction as the excitation flux 114 is supplied to the armature coils 92, 93 wound around the magnetic teeth facing the magnetic salient pole 82. The above-mentioned current is supplied to the armature coils 91, 92, and 93 respectively by the driving circuits 143, 144, 145, and magnetization state of the control magnet 88 is changed. Magnetization state of the control magnet 89 is changed by similar step succeedingly.

The voltage detector 146 detects induced voltage resulting from flux amount flowing into the magnetic teeth 74 with rotation of the rotor after magnetization change of the control magnet, magnetization state of the individual control magnet is confirmed along with output of the position sensor 148 of the rotor. The control part 142 will increase amplitude of current supplied to the armature coil for magnetization change of the control magnet in case that amplitude change of induced voltage is smaller than expected value as the result, and decrease it in case that amplitude change of induced voltage is larger than expected value.

Magnetization state of the control magnet can be uniform by all the circumferences by the above-mentioned control step explained referring to FIG. 14. Although current is supplied to the armature coil from the drive circuit 143, 144, 145 as a unit for magnetization change, the current for magnetization state change will be added only to one armature coil, and still finer control is also possible. Moreover, it is also possible to change current amplitude supplied to the excitation coil 78, and various corrections are possible according to the specification of the rotating electric machine.

The rotating electric machine system according to a fourth embodiment of the present invention will be explained by using FIGS. 15 to 20. The fourth embodiment is a rotating electric machine system that two rotors queue up axially, and are opposing to an armature through a radial gap, and an excitation coil is arranged between two rotors.

Figure 15:
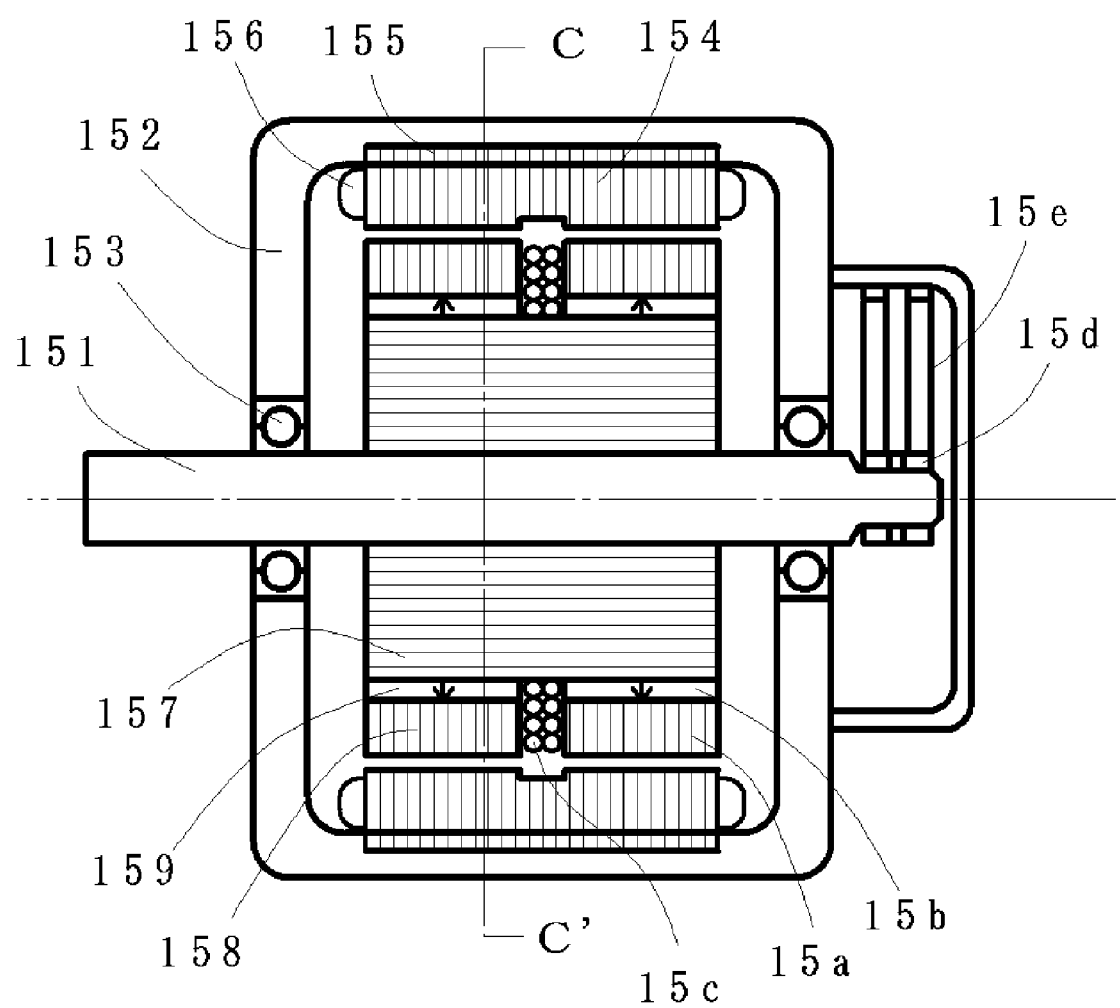
FIG. 15 is a longitudinal sectional view of a rotating electric machine apparatus according to a fourth embodiment of the present invention.

FIG. 15 shows a longitudinal sectional view of an embodiment of the present invention applied to a rotating electric machine apparatus having a radial gap structure, a rotational shaft 151 is supported rotatably by a housing 152 through bearings 153. The armature has magnetic teeth 154 extending radially from a cylindrical magnetic yoke 155 fixed to the housing 152, and an armature coil 156 wound around the magnetic teeth 154. A first rotor has a surface magnetic pole part 158 and a control magnet 159, a second rotor has a surface magnetic pole part 15a and a control magnet 15b, and two rotors are being fixed to the rotational shaft 151 considering a cylindrical magnetic core 157 as a common component. The cylindrical magnetic core 157 is a unified structure of a cylindrical magnetic core in each rotor and an excitation flux path member, and is composed of powdered core so that magnetic flux is easy to flow axially.

An excitation coil 15c is arranged between the surface magnetic pole parts 158 and 15a equivalent to a space between two rotors so as to wind around the cylindrical magnetic core 157 and to generate an excitation flux in flux path composed of the cylindrical magnetic core 157, the control magnet 159, the surface magnetic pole part 158, the magnetic teeth 154, the cylindrical magnetic yoke 155, the magnetic teeth 154, the surface magnetic pole part 15a and the control magnet 15b. The current is supplied to the excitation coil 15c through a brush 15e and a slip ring 15d.

Figure 16:
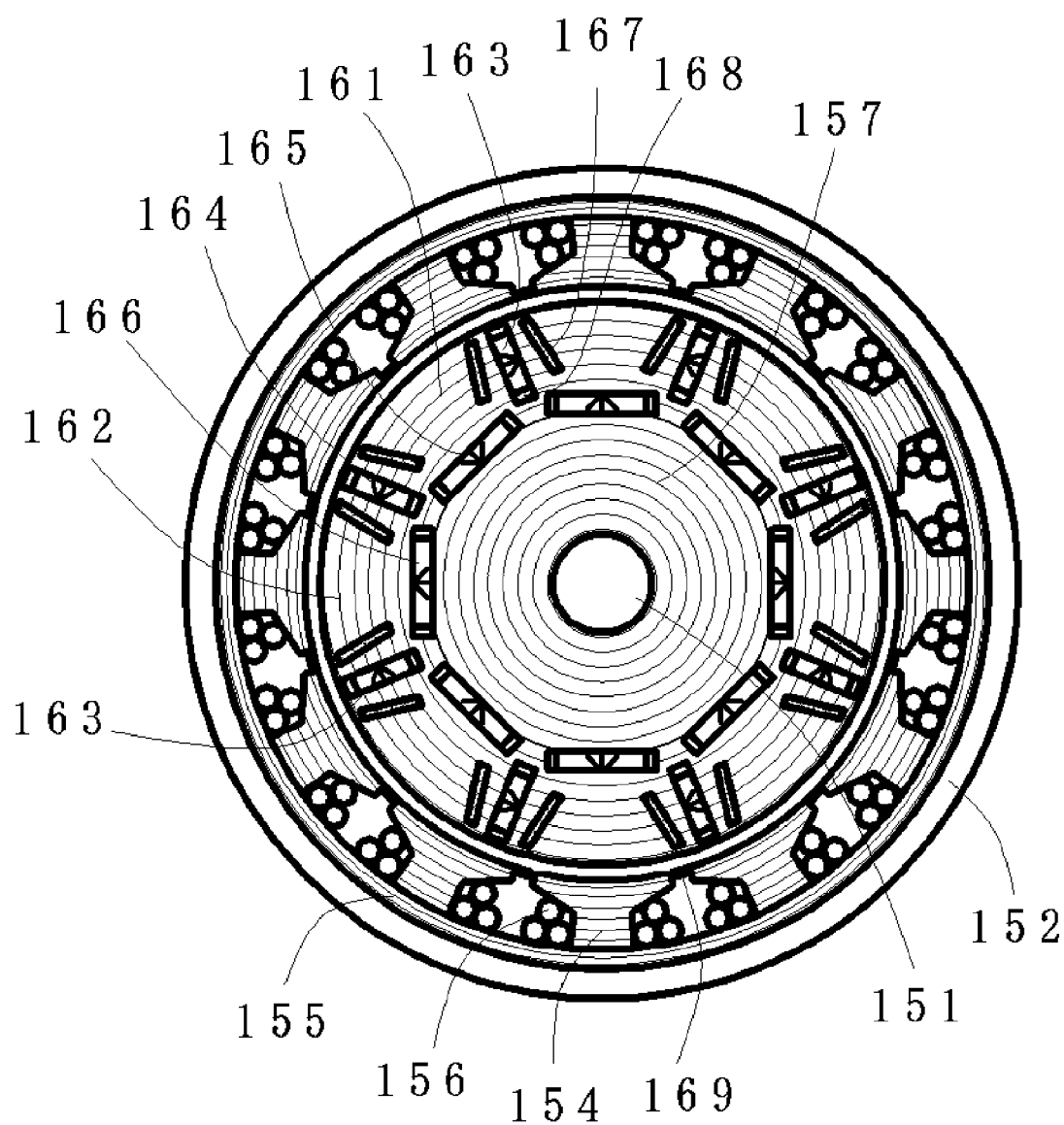
FIG. 16 is a sectional view showing an armature and a rotor of the rotating electric machine apparatus shown in FIG.

FIG. 16 illustrates a sectional view of the armature and the rotor along C-C' of FIG. 15, and some of component parts are appended with numbers for explaining the reciprocal relation. The surface magnetic pole part 158 has composition that the cylindrical magnetic substrate is sectioned in a circumferential direction by a copper plate and a permanent magnet. Adjacent magnetic salient poles are represented by numbers 161, 162. And a first magnetic salient pole 161 and a second magnetic salient pole 162 are arranged alternately in circumferential direction. Adjacent permanent magnets are represented by numbers 163, 164. And the permanent magnet 163 and the permanent magnet 164 have circumferential magnetization and are arranged alternately in circumferential direction. Also magnetization direction of the permanent magnet 163 and that of the permanent magnet 164 are reversed alternately so that the first magnetic salient pole 161 and the second magnetic salient pole 162 are magnetized in different polarities from each other.

The control magnet 159 shown in FIG. 15 is identified as a control magnet 165 arranged at inner side of the first magnetic salient pole 161, and a control magnet 166 arranged at inner side of the second magnetic salient pole 162. Either control magnets 165, 166 are disposed away from magnetic teeth 154. Arrows in the permanent magnets 163, 164 and in the control magnets 165, 166 indicate magnetization direction. Number 167 indicates arranged copper plate on both sides of each permanent magnet 163, 164, and number 168 represents a non-magnetic member disposed in ends of the permanent magnet and the control magnet.

An interval is provided so that flux path of magnetic material may exist between each copper plate 167 and permanent magnets 163, 164, thickness of the copper plate 167 is set to about 0.5 millimeters so that magnetic flux may be able to pass through, although magnetic resistance becomes large. Alternating magnetic flux from the armature coil 156 causes eddy current in the copper plate 167, and magnetic field strength added to the permanent magnets 163, 164 is restrained. Direct current like flux from the permanent magnets 163, 164 flows through the copper plate 167 and the flux path between the copper plate 167 and the permanent magnets 163, 164. Magnetic flux generated by the armature coil spreads while leaving the armature surface, and magnetic field strength becomes small. On the occasion of driving the rotor to rotate, magnetic flux leakage from between mainly adjacent teeth 154 is added to the rotor, the control magnet is disposed at inside part of the magnetic salient pole, therefor magnetic field strength added to the control magnet is restrained. The inside part of the magnetic salient pole where the control magnet is disposed is a position where magnetic flux generated by the armature coil on the occasion of driving the rotor will not have an irreversible influence on magnetization state of the control magnet.

The armature has the magnetic teeth 154 extending radially from the cylindrical magnetic yoke 155 fixed to the housing 152, and the armature coil 156 wound around the magnetic teeth 154. A saturable magnetic junction 169 that are short in radial direction is provided between contiguous edges of the magnetic teeth 154. The magnetic teeth 154 and the saturable magnetic junction 169 are punched out of a silicon steel plate by a predetermined die and stacked and wound with the armature coil 156, and then, combined with the cylindrical magnetic yoke 155 composed of powder magnetic core, and thereby the armature is produced.

Figure 17:
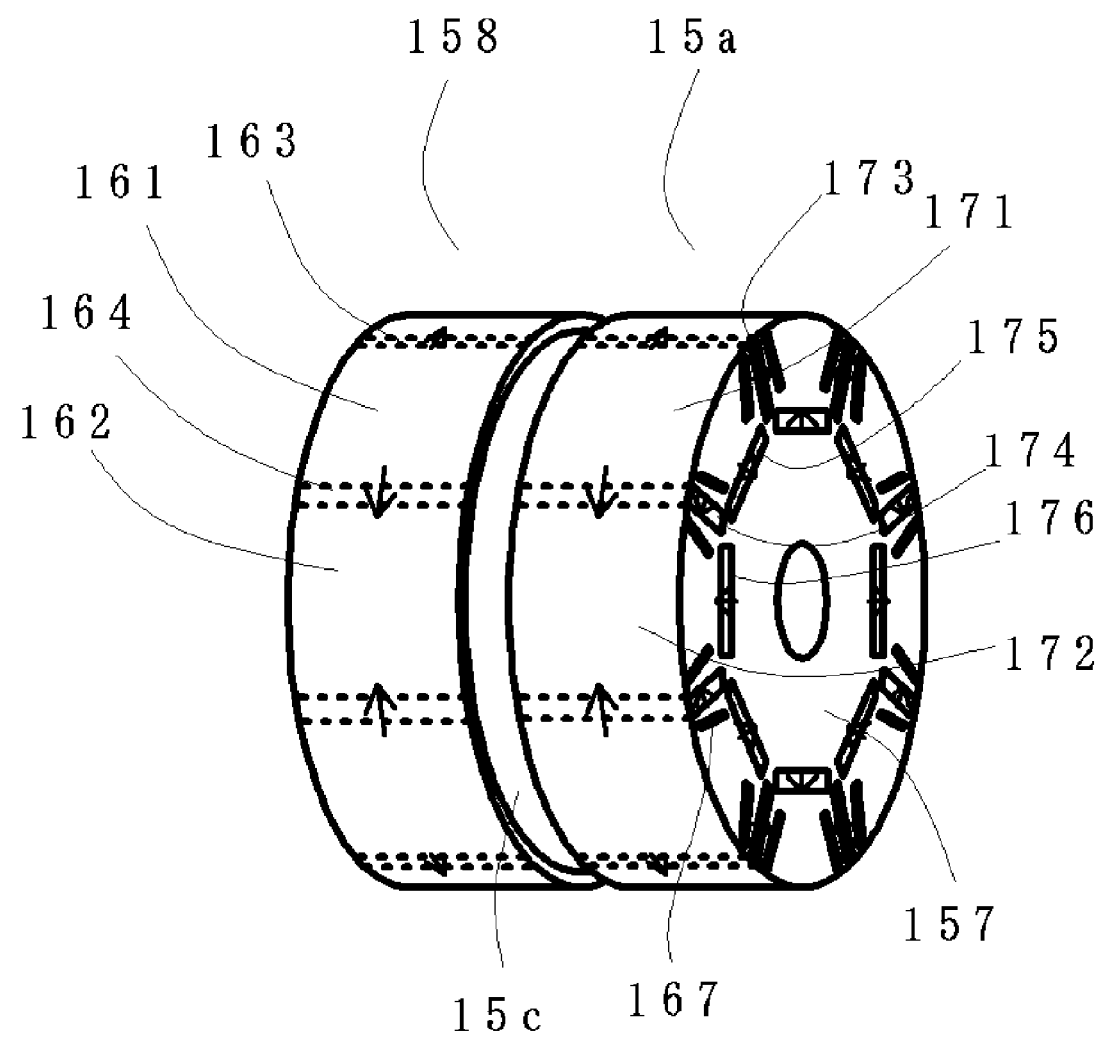
FIG. 17 is a perspective view of the rotor of the rotating electric machine shown in FIG. 15.

The magnetic pole composition of the surface magnetic pole part 158 equivalent to the first rotor is shown in FIG. 16. Perspective view of the whole rotor is shown in FIG. 17, the magnetic pole composition of the surface magnetic pole part 15a equivalent to the second rotor will be explained, and mutual relation of the surface magnetic pole parts 158 and 15a will be explained. The composition of the surface magnetic pole part 15a is completely the same as that of the surface magnetic pole part 158, a cylindrical magnetic substrate is sectioned in a circumferential direction by the copper plate 167 and permanent magnets 173, 174 with circumferential magnetization, and a first magnetic salient pole 171 and a second magnetic salient pole 172 that are magnetized in different polarities are arranged alternately in circumferential direction. In addition, the control magnet 15b shown in FIG. 15 is arranged on inner side of the first magnetic salient pole 171, the second magnetic salient pole 172 as control magnets 175, 176 respectively. The first magnetic salient pole 161 is magnetized in S pole with the permanent magnets 163, 164, the first magnetic salient pole 171 is magnetized in S pole with the permanent magnets 173, 174, and the first magnetic salient pole 161 and the first magnetic salient pole 171 are lined axially.

Figure 18A:
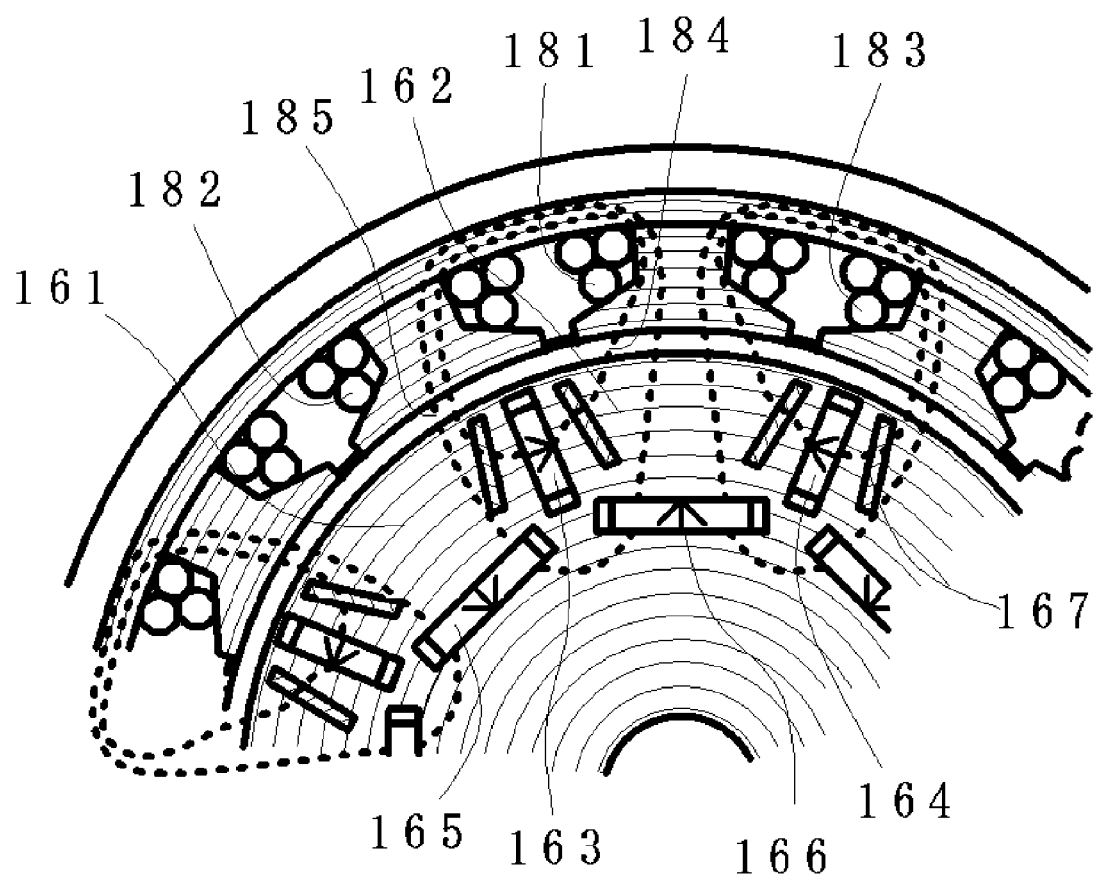
FIG. 18A is showing magnetic flux flow in field strengthening and a magnified sectional view of the armature and the rotor shown in FIG. 16.
Figure 18B:
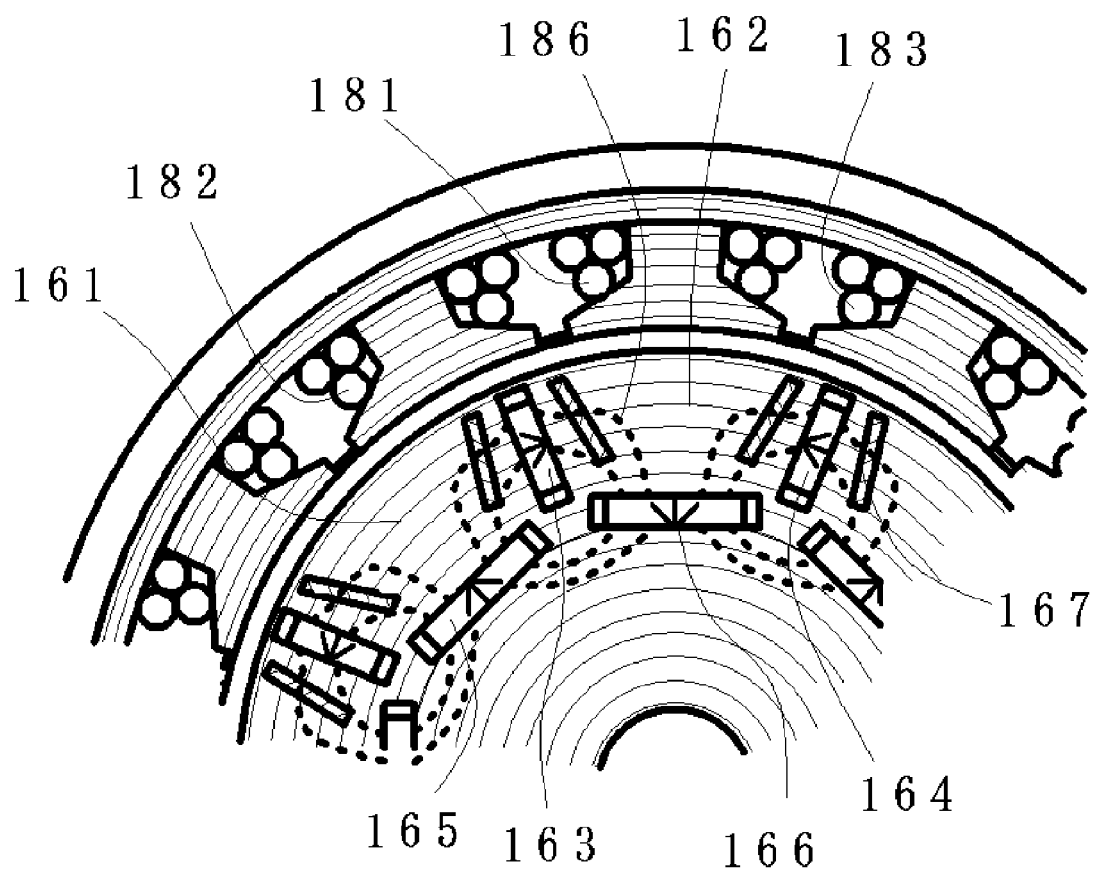
FIG. 18B is showing magnetic flux flow in field weakening and a magnified sectional view of the armature and the rotor shown in FIG. 16.

FIGS. 18A and 18B are magnified sectional views of the armature and the rotor shown in FIG. 16, the flow of the magnetic flux will be explained. In these figures, the armature coil 156 is shown as repeated armature coils 181, 182, and 183 in the armature coils of U-phase, V-phase, and W-phase, respectively.

In FIG. 18A, dotted lines 184 represent magnetic flux coming from the permanent magnets 163, 164. Dotted lines 185 represent magnetic flux coming from the control magnets 165, 166. The magnetic salient poles 161, 162 are connected each other by narrow magnetic members in the figure, but the narrow magnetic members are saturated easily magnetically, so they can be ignored magnetically. The permanent magnets 163, 164 and the control magnets 165, 166 magnetize the first magnetic salient pole 161 in S pole, and magnetize the second magnetic salient pole 162 in N pole as shown in the figure.

FIG. 18B indicates the state that magnetization direction of the control magnets 165, 166 is contrary to the state shown in FIG. 18A. The control magnets 165, 166, and the permanent magnets 163, 164 constitute closed magnetic flux path, and then flux amount that flows into the armature side is decreased. Dotted line 186 represents magnetic flux which flows through the above closed magnetic flux path, and case shown in FIG. 18B corresponds to the state of field weakening. The magnetic flux amount which flows to the armature side in this state is established by saturation flux density and the magnetic pole area, etc. of the permanent magnets 163, 164, the control magnets 165, 166. When making magnetization direction of the control magnet 166 into outside diameter direction and the control magnet 165 into inside diameter direction, flux amount through the armature coil is increased as indicated in FIGS. 18A and 18B. In case of the control magnet 166, the magnetization in outside diameter direction corresponds to the first magnetization. In case of the control magnet 165, the magnetization in inside diameter direction corresponds to the first magnetization.

In this embodiment, the permanent magnets 163, 164, 173, 174 consist of the neodymium magnet of which magnetization state is hard to be changed, the control magnets 165, 166, 175, 176 consist of the alnico magnet capable of magnetization change compared with the permanent magnets 163, 164, 173, 174, and magnetization state of the control magnets 165, 166, 175, 176 is changed and flux amount through the armature coil is controlled. Composition and principle of operation which control the magnetization state of the control magnets 165, 166, 175, 176 are explained below. The excitation coil 15c is arranged around the rotational shaft 151 between the surface magnetic pole parts 158 and 15a so that excitation flux may be generated in a magnetic flux path including the cylindrical magnetic core 157, the control magnet 159, the surface magnetic pole part 158, the magnetic teeth 154, the cylindrical magnetic yoke 155, the magnetic teeth 154, the surface magnetic pole part 15a and the control magnet 15b as indicated in FIG. 15.

Figure 19:
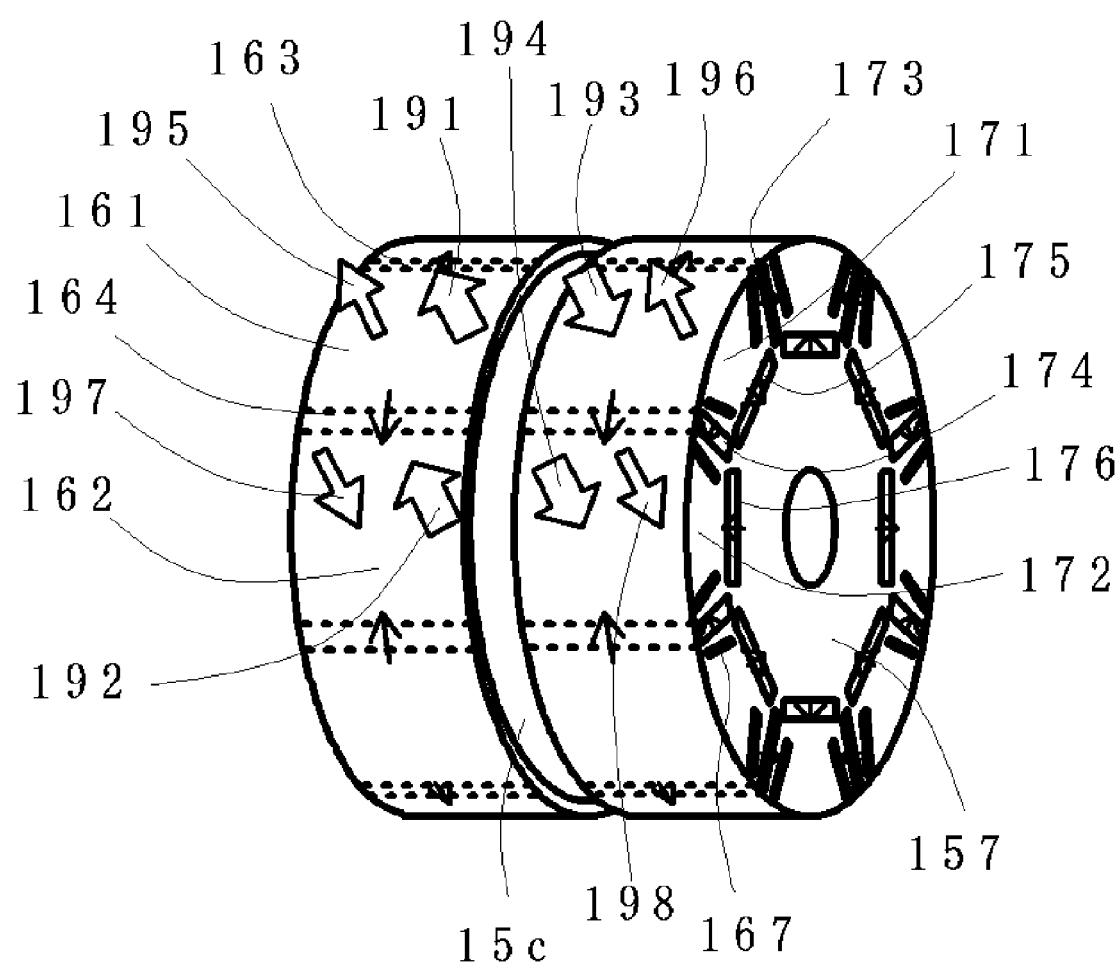
FIG. 19 is a perspective view of the rotor of the rotating electric machine shown in FIG. 15, and is showing direction of magnetic flux supplied from an armature coil and an excitation coil for magnetization change of a control magnet.

The step which controls magnetization state of the control magnets 165, 166, 175, 176 selectively will be explained while referring to FIGS. 19, 20. FIG. 19 indicates the case when magnetization direction of the control magnet 165 is changed to outside diameter direction and magnetization direction of the control magnet 176 is changed to inside diameter direction. Excitation current is beforehand supplied to the excitation coil 15c so that excitation flux may flow through the control magnet 165 to outer diameter direction and may flow through the control magnet 176 to inner diameter direction. Numbers 191, 192, 193, and 194 indicate direction of the excitation flux which flows through the first magnetic salient pole 161, the second magnetic salient pole 162, the first magnetic salient pole 171, and the second magnetic salient pole 172, respectively.

Furthermore, current is supplied to the armature coil so that magnetic flux may flow through the control magnet 165 in outer diameter direction and may flow through the control magnet 176 in inner diameter direction. In FIG. 18A, electric current is supplied to the armature coils 182, 183 facing the first magnetic salient pole 161 so that magnetic flux 195 flows through the first magnetic salient pole 161 to outer diameter direction. Furthermore, electric current is supplied to the armature coil 181 facing the second magnetic salient pole 162 so that magnetic flux 197 flows through the second magnetic salient pole 162 to inner diameter direction. The magnetic flux 195 and 196 flow through the first magnetic salient poles 161, 171 in same direction, respectively, and the magnetic flux 197 and 198 flow through the second magnetic salient poles 162, 172 in same direction, respectively.

The flux 195 by the armature coil and the excitation flux 191 by the excitation coil flow through the first magnetic salient pole 161 in same direction, and the flux 198 by the armature coil and the excitation flux 194 by the excitation coil flow through the second magnetic salient pole 172 in same direction. The flux 197 and the excitation flux 192 flow through the second magnetic salient pole 162 in opposite direction each other, and the flux 196 and the excitation flux 193 flow through the first magnetic salient pole 171 in opposite direction each other. Therefore, since enough magnetic flux does not flow through the second magnetic salient pole 162 and the first magnetic salient pole 171, magnetization state of the control magnets 166, 175 is not influenced. Enough magnetic flux flows in the first magnetic salient pole 161 and the second magnetic salient pole 172, magnetization direction of the control magnet 165 is changed to outside diameter direction, and magnetization direction of the control magnet 176 is changed to inner diameter direction.

Figure 20:
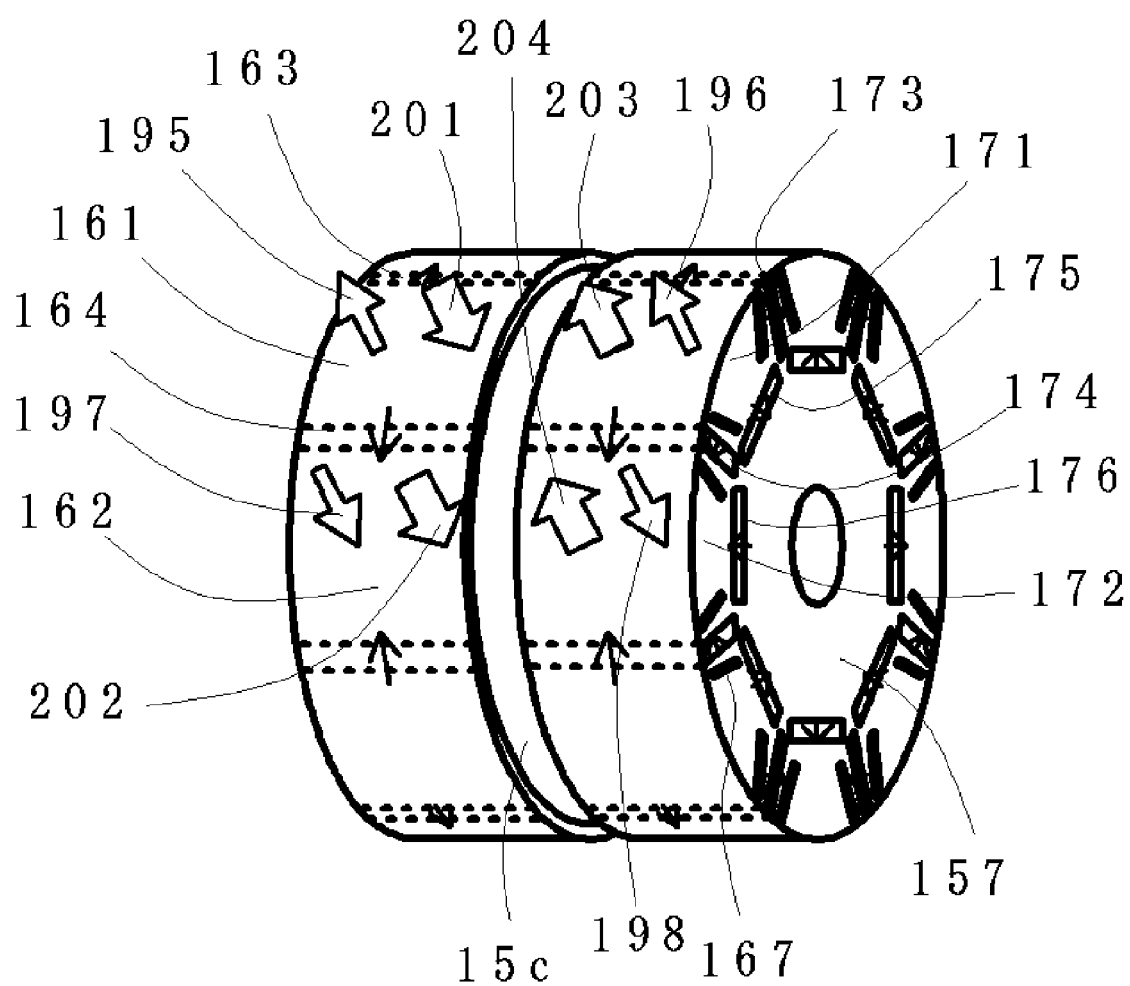
FIG. 20 is a perspective view of the rotor of the rotating electric machine shown in FIG. 15, and is showing direction of magnetic flux supplied from the armature coil and the excitation coil for magnetization change of the control magnet.

FIG. 20 indicates the case when magnetization direction of the control magnet 166 is changed to inner diameter direction and magnetization direction of the control magnet 175 is changed to outer diameter direction. The polarity of the electric current supplied to the excitation coil 15c is reversed from the case of FIG. 19, numbers 201, 202, 203, 204 indicate direction of the excitation flux that flows respectively in the magnetic salient poles 161, 162, 171, 172. Therefore, the flux generated by the armature coil and the excitation flux flow through the second magnetic salient pole 162 in same direction, and flow through the first magnetic salient pole 171 in same direction. And, magnetization direction in the control magnet 176 is changed to inner diameter direction, magnetization direction in the control magnet 175 is changed to outer diameter direction.

Thus, magnetization state of the control magnets 165, 166, 175, 176 shown in FIG. 18A according to the above-mentioned step is changed into a state shown in FIG. 18B, or it is changed into the state shown in FIG. 18A from the state shown in FIG. 18B. Then, flux amount through the armature coil 156(181, 182, 183) is controlled.

In the first and the second embodiments, when magnetization direction in the control magnet is changed to field strengthening side from field weakening side, a part of magnetic flux that the excitation coil and the armature coil generate flows through the permanent magnet, and it is not easy to concentrate magnetic flux on the control magnet. In this embodiment, since the copper plate 167 is arranged near the magnetic pole of the permanent magnets 163, 164, 173, 174, pulse-like magnetic flux generated by the armature coil 156 (181, 182, 183) causes an eddy current, cannot pass the copper plate 167 easily, and is concentrated on the control magnet 165, 166, 175, 176. Therefore the electric current supplied to the excitation coil and the armature coil on the occasion of magnetization change in the control magnets 165, 166, 175, 176 can be made smaller.

In the above, the composition of this embodiment was shown using FIGS. 15-20, and the principle of magnetization change of the control magnet was explained for changing flux amount through the armature coil. Although the rotating electric machine shown in this embodiment operates as field controllable electric motor, or field controllable dynamo, the composition except being related to field control is the same as conventional rotating electric machine, and explanation of operation as an electric motor or a dynamo is omitted.

In this embodiment, since the copper plate 167 is arranged near the magnetic pole of the permanent magnets 163, 164, 173, 174, the electric current supplied to the excitation coil and the armature coil on the occasion of magnetization change in the control magnets 165, 166, 175, 176 becomes made smaller. The copper plate 167 makes hard to pass alternating magnetic flux generated by the armature coil also on the occasion of driving the rotor to rotate, and can decrease magnetic field strength added to the permanent magnets 163, 164, 173, 174. Therefore, though the neodymium magnet was applied for the permanent magnets 163, 164, 173, 174 in this embodiment, other magnet material with low coercivity except rare earth material can be used for the permanent magnets 163, 164, 173, 174 by appropriately setting thickness of the copper plate 167 and width of the flux path between the copper plate 167 and the permanent magnets 163, 164, 173, 174.

The rotating electric machine system according to a fifth embodiment of the present invention will be explained by using FIGS. 21 to 25. The fifth embodiment is a rotating electric machine system that two rotors queue up axially and are opposing to an armature through a radial gap. The rotating electric machine system of this embodiment is driven to rotate mainly by reluctance torque. And starting torque, control at the time of regeneration braking thereof are improved.

Figure 21:
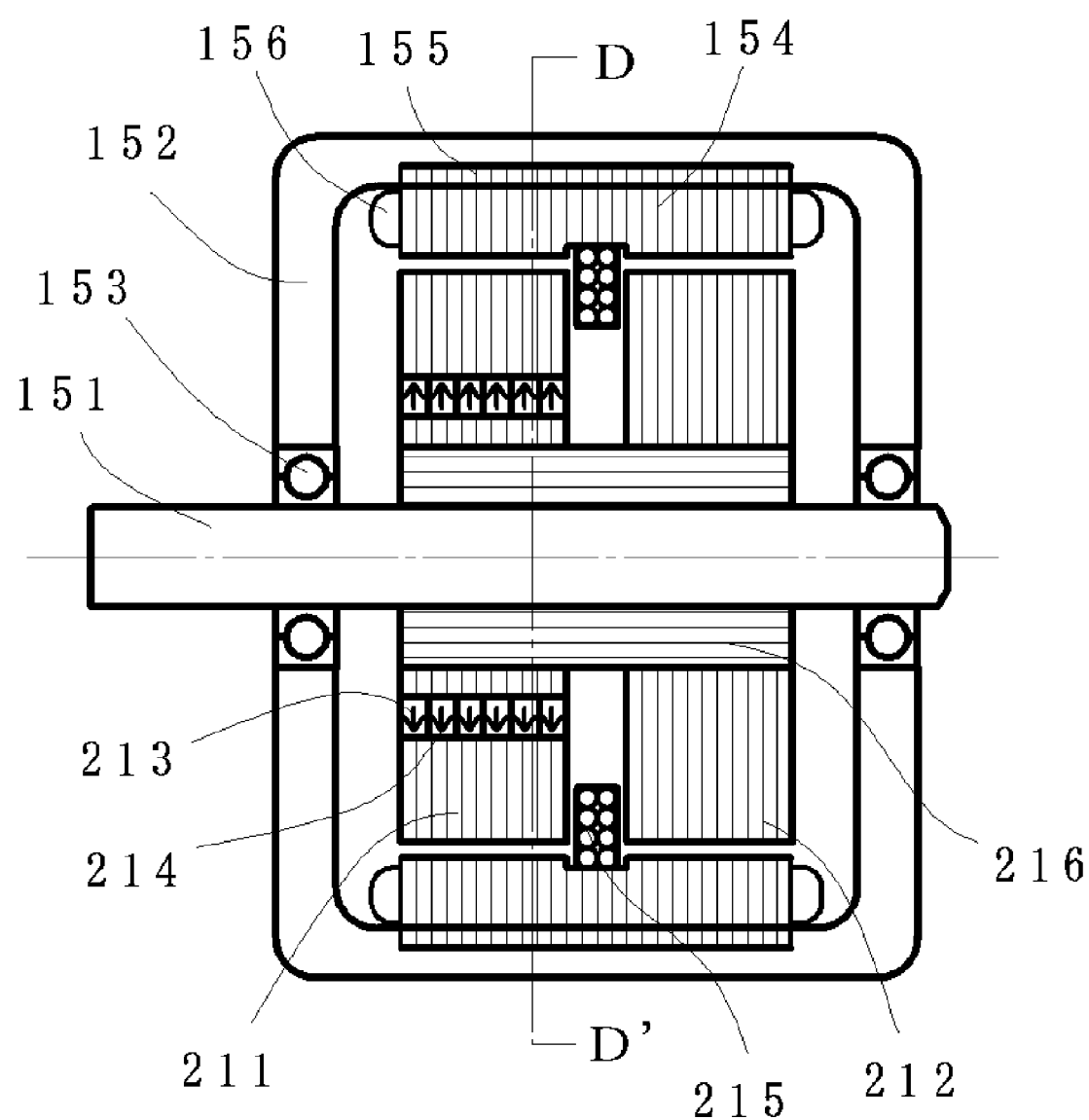
FIG. 21 is a longitudinal sectional view of a rotating electric machine apparatus according to a fifth embodiment of the present invention.

FIG. 21 shows a longitudinal sectional view of an embodiment of the present invention applied to a rotating electric machine apparatus having a radial gap structure, the rotational shaft 151 is supported rotatably by the housing 152 through the bearings 153. The armature has the magnetic teeth 154 extending radially from the cylindrical magnetic yoke 155 fixed to the housing 152, and the armature coil 156 wound around the magnetic teeth 154. A first rotor has a surface magnetic pole part 211, a second rotor has a surface magnetic pole part 212, and two rotors are being fixed to the rotational shaft 151 considering a cylindrical magnetic core 216 as a common component. The respective surface magnetic pole parts has magnets only in one of adjacent magnetic salient poles with circumferential direction, and a permanent magnet 213, a control magnet 214 are indicated in FIG. 21. The permanent magnet 213 and the control magnet 214 are disposed alternately axially. The cylindrical magnetic core 216 is a unified structure of a cylindrical magnetic core in each rotor and an excitation flux path member, and is composed of powdered core so that magnetic flux is easy to flow axially. An excitation coil 215 is arranged at the armature side so as to wind around the rotational shaft 151, and to generate an excitation flux in flux path composed of the cylindrical magnetic core 216, the surface magnetic pole part 211, the magnetic teeth 154, the cylindrical magnetic yoke 155, the magnetic teeth 154, and the surface magnetic pole part 212.

Figure 22:
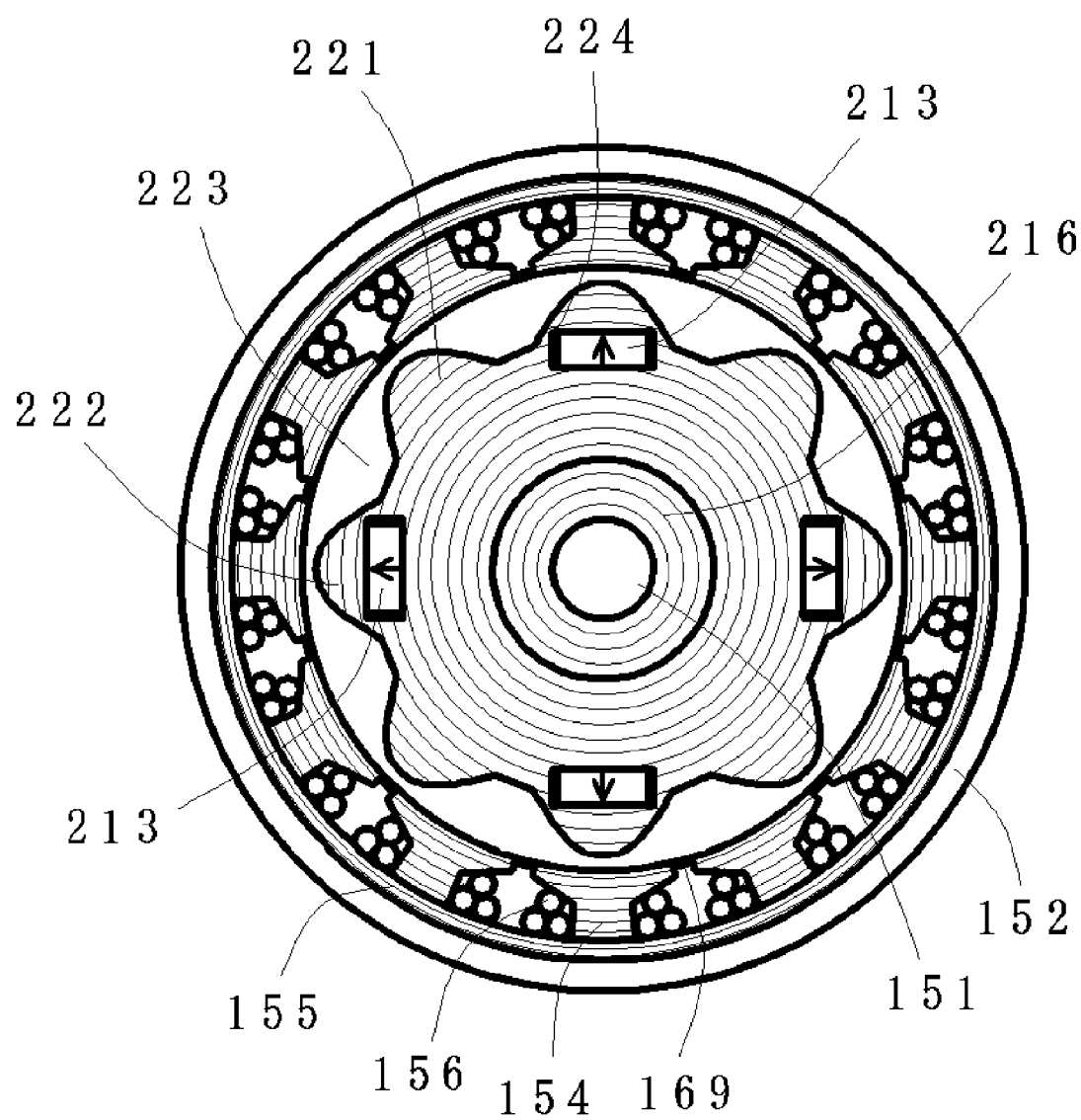
FIG. 22 is a sectional view showing an armature and a rotor of the rotating electric machine apparatus shown in FIG. 21.

FIG. 22 illustrates a sectional view of the armature and the rotor along D-D' of FIG. 21, and some of component parts are appended with numbers for explaining the reciprocal relation. The surface magnetic pole part 211 consists of magnetic material having a convex part and a concave part on the surface alternately in circumferential direction. Adjacent convex parts are represented by a first magnetic salient pole 221 and a second magnetic salient pole 222, and are disposed alternately in circumferential direction. Number 223 indicates the concave part. The permanent magnet 213 and the control magnet 214 (not shown in this figure) are disposed in inside part of the second magnetic salient pole 222 away from the armature, the first magnetic salient pole 221 and the second magnetic salient pole 222 are magnetized in different polarities from each other. Number 224 indicates non-magnetic member arranged at an end of the permanent magnet 213, and an arrow in the permanent magnet 213 indicates magnetization direction thereof. Magnetic resistance in the surface of the rotor is large at the concave part 223, and the reluctance torque is made large. Because the composition of the armature is the same as the fourth embodiment shown in FIG. 16, repeated explanation is omitted.

Figure 23:
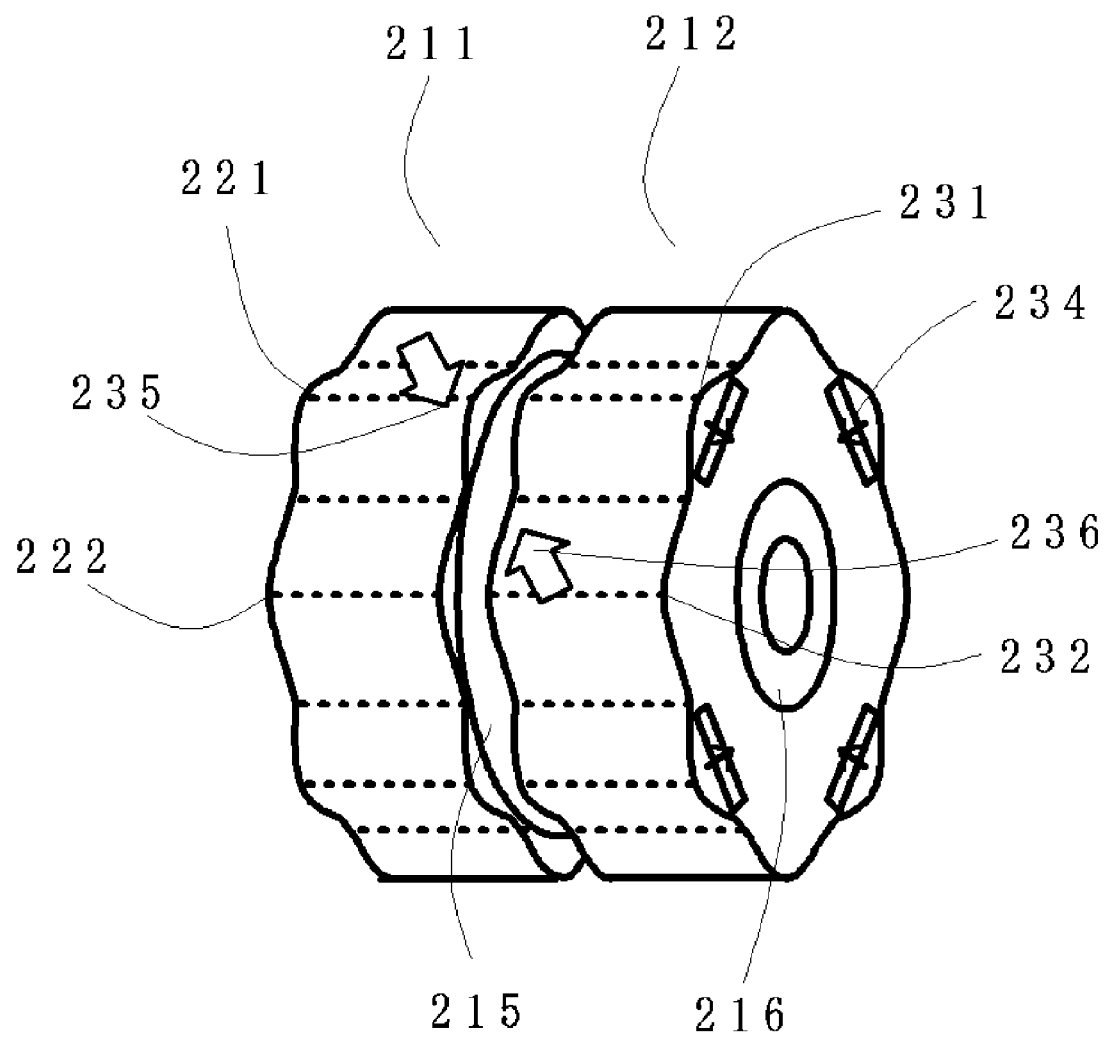
FIG. 23 is a perspective view of the rotor of the rotating electric machine shown in FIG. 21.

The magnetic pole composition of the surface magnetic pole part 211 equivalent to the first rotor is shown in FIG. 22. Perspective view of the whole rotor is shown in FIG. 23, the magnetic pole composition of the surface magnetic pole part 212 equivalent to the second rotor will be explained, and mutual relation of the surface magnetic pole parts 211 and 212 will be explained. The composition of the surface magnetic pole part 212 is almost the same as that of the surface magnetic pole part 211, and the surface magnetic pole part 212 is composed of magnetic material having the convex part and the concave part in the direction of surroundings. Adjacent magnetic salient poles are represented by numbers 231, 232, and a first magnetic salient pole 231 and a second magnetic salient pole 232 are disposed alternately in circumferential direction. The permanent magnet 233 (not shown in this figure) and the control magnet 234 are disposed in inside part of the first magnetic salient pole 231 away from the armature, the first magnetic salient pole 231 and the second magnetic salient pole 232 are magnetized in different polarities from each other. The excitation coil 215 is arranged at the armature side so as to wind around the rotational shaft 151, but the excitation coil 215 is indicated between the surface magnetic pole parts 211 and 212 in the figure so that spatial relationship of the surface magnetic pole parts 211, 212 and the excitation coil 215 is easy to be understood.

The difference between the surface magnetic pole part 211 and 212 is to be location of the permanent magnet and the control magnet. The first magnetic salient pole 221 is magnetized by the permanent magnet 213 and the control magnet 214 in S pole, the first magnetic salient pole 231 is magnetized by the permanent magnet 233 and the control magnet 234 in S pole. And the first magnetic salient pole 221 and the first magnetic salient pole 231 which are similar polarity are in line axially.

This embodiment is the extreme constitution example that assumed the permanent magnet and the control magnet arranged in one side of the adjacent magnetic salient poles as zero thickness, and flux amount through the armature coil 156 can be adjusted by the excitation coil 215. That is, permeability of magnets is close to that of an air gap, magnetic flux amount coming from the magnet is fixed mostly, so the magnetically saturated magnet can be applied as the isolation member of bi-directional magnetic flux. When the excitation flux is supplied from the excitation coil 215, the first magnetic salient pole 221 and the second magnetic salient pole 232 are connected directly through the cylindrical magnetic core 216, so the excitation flux flows to the armature side easily through the first magnetic salient pole 221 and the second magnetic salient pole 232. Numbers 235, 236 indicate direction of the respective excitation fluxes which flow to the armature side through the first magnetic salient pole 221 and the second magnetic salient pole 232, the direction of the excitation flux 235, 236 is controlled by direction of electric current supplied to the excitation coil 215.

Figure 24A:
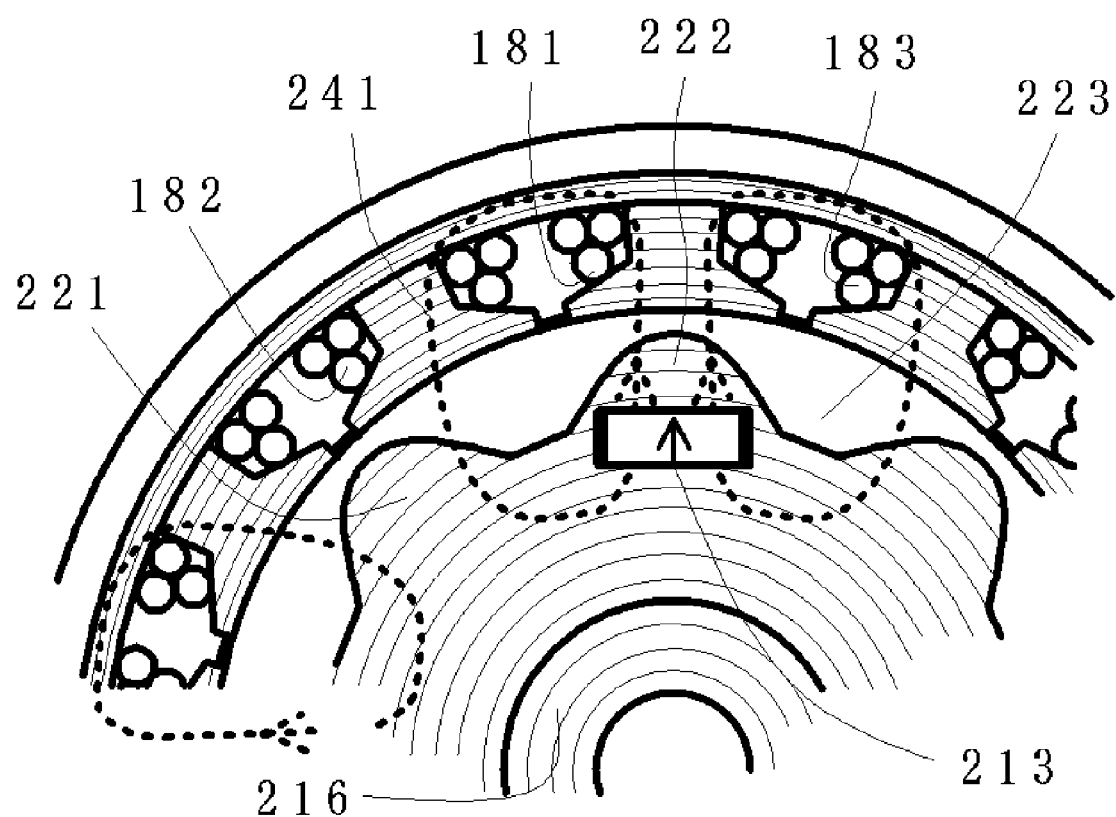
FIG. 24A is showing magnetic flux flow in field strengthening and a magnified sectional view of the armature and the rotor shown in FIG. 16.
Figure 24B:
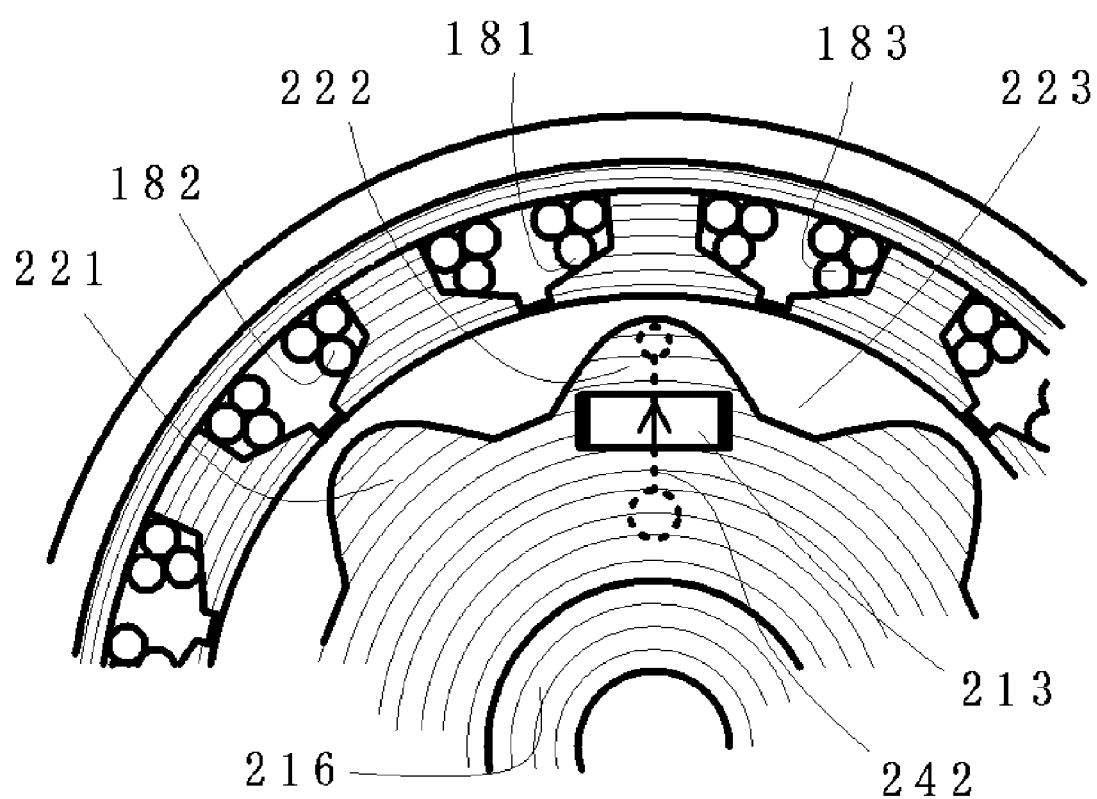
FIG. 24B is showing magnetic flux flow in field weakening and a magnified sectional view of the armature and the rotor shown in FIG. 22.

FIGS. 24A and 24B are magnified sectional views of the armature and the rotor shown in FIG. 22, the flow of the magnetic flux will be explained. In these figures, the armature coil 156 is shown as repeated armature coils 181, 182, and 183 in the armature coils of U-phase, V-phase, and W-phase, respectively.

In FIG. 24A, dotted lines 241 represent magnetic flux coming from the permanent magnets 213 and the control magnet 214 (not shown in FIG. 24A). FIG. 24B indicates the state that magnetization direction of the control magnets 214 (not shown in FIG. 24B) is contrary to the state shown in FIG. 24A. The flux 242 coming from the permanent magnet 213 flows axially, and constitutes closed magnetic flux path with the control magnet 214 (not shown in FIGS. 24A, 24B), and then flux amount that flows into the armature side is decreased. The case shown in FIG. 24B corresponds to the state of field weakening. The magnetic flux amount which flows to the armature side in this state is established by saturation flux density and the magnetic pole area, etc. of the permanent magnet 213, the control magnet 214.

Though the relation between the permanent magnet 233 and the control magnet 234 in the second surface magnetic pole part is not shown in the figure, flux amount through the armature coil is increased when making magnetization direction of the control magnet 214 into outer diameter direction and making magnetization direction of the control magnet 234 into inner diameter direction as shown in FIGS. 24A, 24B, and FIG. 23. In the control magnet 214, magnetization of outer diameter direction is equivalent to the first magnetization, and magnetization of inner diameter direction in the control magnet 234 is equivalent to the first magnetization.

In this embodiment, the permanent magnets 213, 233 consist of the neodymium magnet of which magnetization state is hard to be changed, the control magnets 214, 234 consist of AlNiCo magnet that change of the magnetization state is easier than the permanent magnets 213, 233. And magnetization state of the control magnets 214, 234 is changed with the excitation coil 215 and the armature coil 156, and flux amount through the armature coil is controlled. Composition and principle of operation which control the magnetization state of the control magnets 214, 234 are explained below. The excitation coil 215 is arranged around the rotational shaft 151 in the axial middle of the armature side so that excitation flux may be generated in a magnetic flux path including the cylindrical magnetic core 216, (the control magnet 214), the surface magnetic pole part 211, the magnetic teeth 154, the cylindrical magnetic yoke 155, the magnetic teeth 154, the surface magnetic pole part 212, (the control magnet 234) as indicated in FIG. 21.

Figure 25:
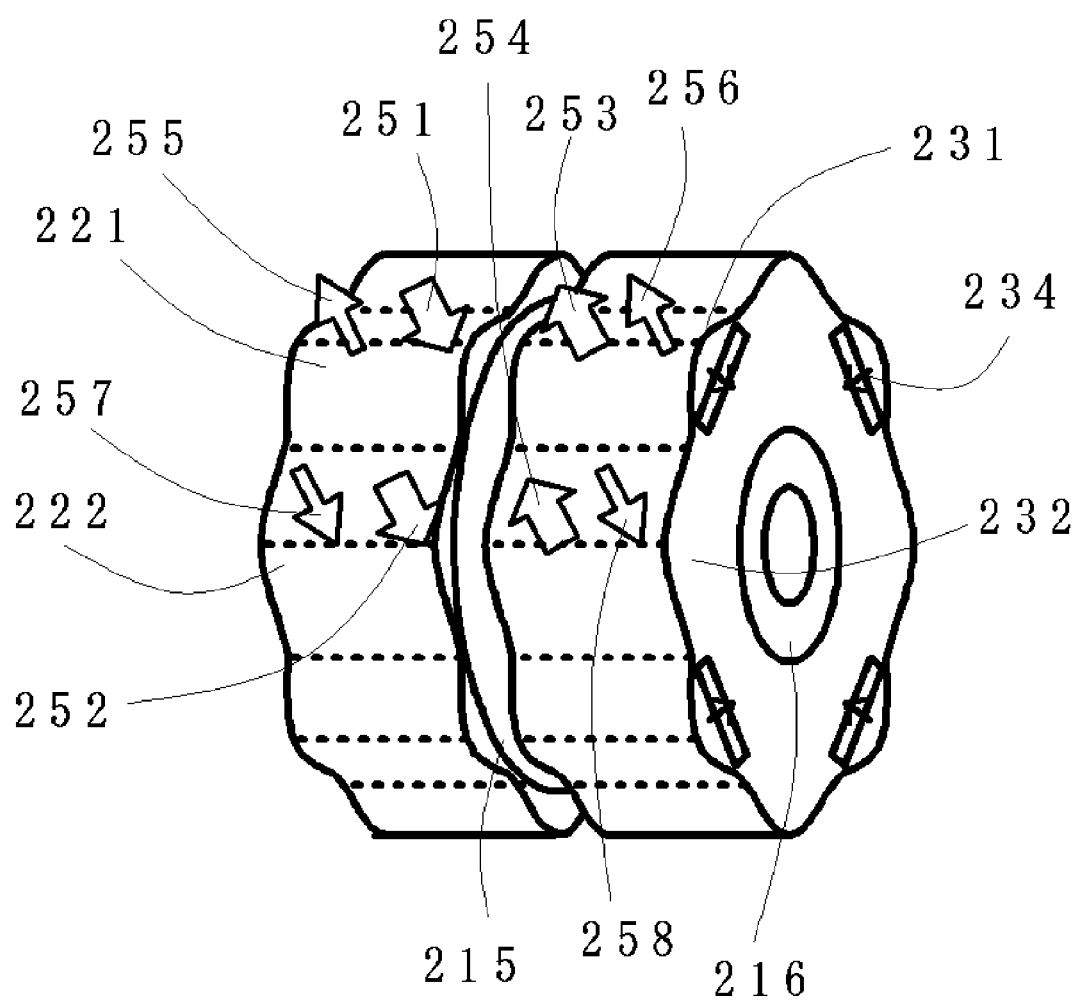
FIG. 25 is a perspective view of the rotor of the rotating electric machine shown in FIG. 21, and is showing direction of magnetic flux supplied from an armature coil and an excitation coil for magnetization change of a control magnet.

The step which controls magnetization state of the control magnets 214, 234 will be explained while referring to FIG. 25. FIG. 25 indicates the case when magnetization direction of the control magnet 214 is changed to inner diameter direction and magnetization direction of the control magnet 234 is changed to outer diameter direction. Excitation current is beforehand supplied to the excitation coil 215 so that excitation flux may flow through the control magnet 234 to outer diameter direction and may flow through the control magnet 214 to inner diameter direction. Numbers 251, 252, 253, and 254 indicate direction of the excitation flux which flows through the first magnetic salient pole 221, the second magnetic salient pole 222, the first magnetic salient pole 231, and the second magnetic salient pole 232, respectively.

Furthermore, current is supplied to the armature coil so that magnetic flux may flow through the control magnet 234 in outer diameter direction and may flow through the control magnet 214 in inner diameter direction. In FIG. 24A, electric current is supplied to the armature coil 181 facing the second magnetic salient pole 222 so that magnetic flux 257 flows through the second magnetic salient pole 222 to inner diameter direction. Furthermore, electric current is supplied to the armature coils 182, 183 facing the first magnetic salient pole 221 so that magnetic flux 255 flows through the first magnetic salient pole 221 to outer diameter direction. The magnetic flux 256 flow through the first magnetic salient pole 231 in same direction as the magnetic flux 255, respectively, and the magnetic flux 258 flow through the second magnetic salient pole 232 in same direction as the magnetic flux 257, respectively.

The flux 256 by the armature coil and the excitation flux 253 by the excitation coil flow through the first magnetic salient pole 231 in same direction, and the flux 257 by the armature coil and the excitation flux 252 by the excitation coil flow through the second magnetic salient pole 222 in same direction. The flux 255 and the excitation flux 251 flow through the first magnetic salient pole 221 in opposite direction each other, and the flux 258 and the excitation flux 254 flow through the second magnetic salient pole 232 in opposite direction each other. Therefore, since enough magnetic flux flows through the first magnetic salient pole 231 and the second magnetic salient pole 222, magnetization direction of the control magnet 234 is changed to outer diameter direction, and magnetization direction of the control magnet 214 is changed to inner diameter direction.

Thus, a state of the field strengthening shown in FIG. 24A according to the above-mentioned step is changed into a state of the field weakening shown in FIG. 24B, or it is changed into the state shown in FIG. 24A from the state shown in FIG. 24B. Then, flux amount through the armature coil 156(181, 182, 183) is controlled. When a state of the field weakening shown in FIG. 24B is changed into a state of the field strengthening shown in FIG. 24A, magnetic flux for changing magnetization state of the control magnet may flow into the permanent magnet side. In that case, current supplied to the armature coil and excitation coil is made enough large so that the permanent magnet may be saturated magnetically and sufficient flux may be supplied to the control magnet. Furthermore, conductive plates can be arranged in the vicinity of the permanent magnet poles, pulse-like flux cannot flow through the permanent magnet easily, and magnetization state change of the control magnet can be made easy.

This embodiment shows the rotating electric machine system driven to rotate by reluctance torque mainly. Usually, flux amount flowing through the armature is made into the minimum as shown in FIG. 24B, the rotor is driven to rotate. However, since starting torque is small only by reluctance torque, flux amount flowing through the armature is made larger as magnetization state of the control magnets 214, 234 shown in FIG. 24A, the excitation flux 235, 236 shown in FIG. 23 by the excitation coil 215 is generated, and then the starting torque is made larger.

Furthermore, the permanent magnet 213 and the control magnet 214 are changed into magnetization state shown in FIG. 24A at the time of regenerating braking, regenerating braking power is controlled by adjusting the current supplied to the excitation coil 215, and energy is efficiently recovered to low speed. Although the step of accumulation of magnetic energy and that of energy recovery are repeated by the conventional method and energy recovery is possible, energy recovery is enabled in high efficiency by this embodiment.

Figure 26:
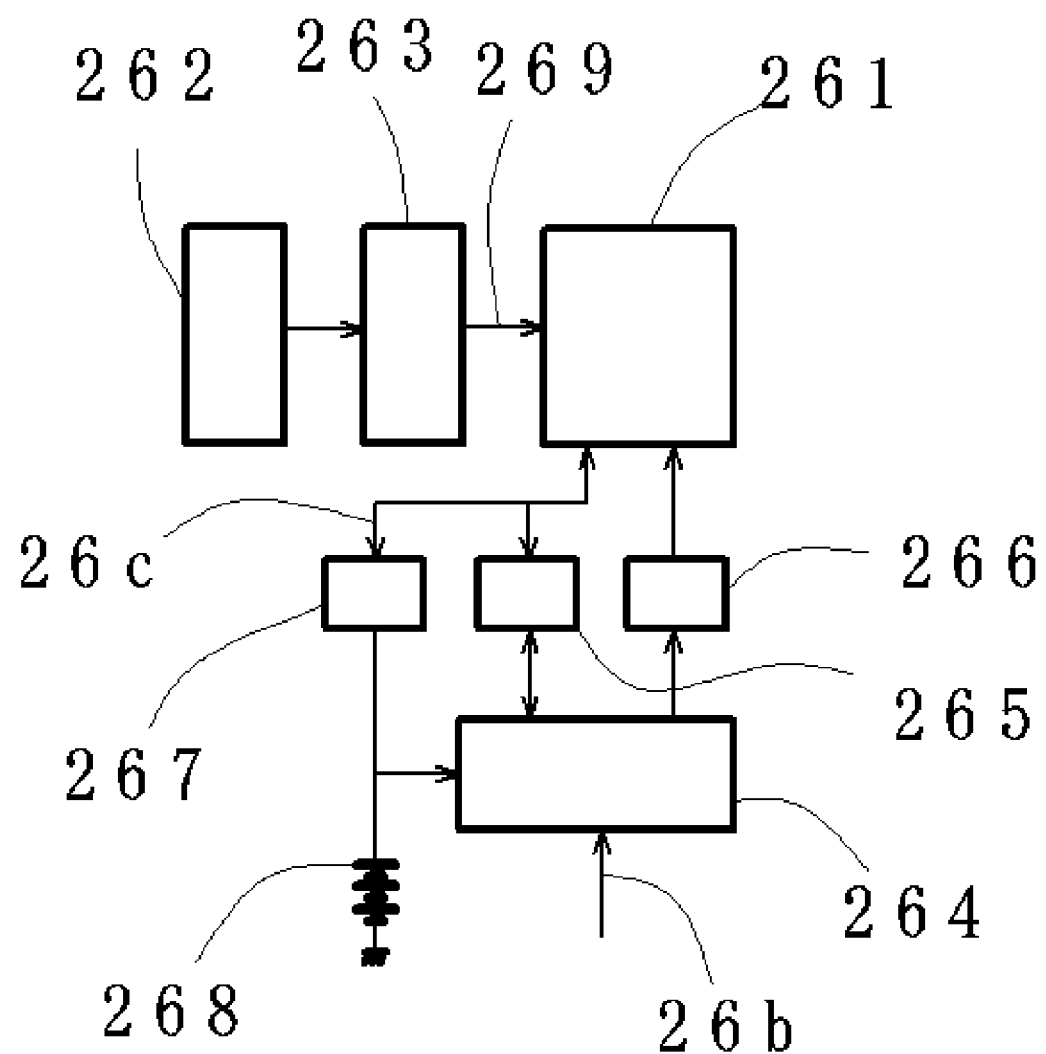
FIG. 26 is a block diagram of a rotating electric machine system according to the sixth embodiment of the present invention.

A rotating electric machine system according to a sixth embodiment of the present invention will be explained by using FIG. 26. The sixth embodiment is a hybrid car that the rotating electric machine system of the second embodiment is built into the front wheel as Inn wheel motor and is combined with a front wheel engine.

In the figure, a front wheel engine 262 is combined with a rotating electric machine apparatus 261 built into the front wheel through a transmission 263, a rotary shaft 269, and the hybrid car is driven by the engine 262 and the rotating electric machine apparatus 261. A control device 264 receives an instruction 26b from a higher rank control device, drives the rotating electric machine apparatus 261 as an electric motor through a drive circuit 265, and controls magnetic field strength in the rotating electric machine 261 through a field control circuit 266. Furthermore, the control device 264 receives the instruction 26b from the higher rank control device, rectifies electric power which appears in an output line 26c of the armature coils 76 through a rectifier circuits 267, and charges a battery 268.

When the hybrid car is driven only by the rotating electric machine 261, the engine 262 is separated in the transmission 263 and load of the rotating electric machine 261 is reduced. When magnet torque needs to be strengthened in low rotating speed region, electric current to increase number of magnet elements with the first magnetization in the control magnets 88, 89 is supplied to the excitation coil 78 and the armature coils 76, and magnetization state of the control magnet 88, 89 is changed, and then flux amount flowing through the armature is increased. When field strength needs to be weakened in high rotating speed region, electric current to increase number of magnet elements with the second magnetization in the control magnets 88, 89 is supplied to the excitation coil 78 and the armature coils 76, and magnetization state of the control magnet 88, 89 is changed, and then flux amount flowing through the armature is reduced.

When the hybrid car is driven only on the torque of the engine 262, electric current to maximize number of magnet elements with the second magnetization in the control magnets 88, 89 is supplied to the excitation coil 78 and the armature coils 76, and then flux amount flowing through the armature is reduced to minimum. Magnetic flux amount leaking from the rotor becomes smallest, so even if the rotor is driven to rotate by the engine 262, eddy current loss is maintained to be small.

When the hybrid car is driven with the rotating electric machine 261 and the engine 262, the engine 262 is combined with the rotary shaft 269 in the transmission 263, and both drive the hybrid car. When the engine 262 has remaining power in driving force, it can make the battery 268 charge by using the rotating electric machine 261 as a dynamo. Generated electric power which appears in the output line 26c of the armature coil 76 is changed into DC current through the rectifier circuits 267, and makes the battery 268 charge.

In that case, when power generation voltage becomes larger than optimal voltage that charges the battery 268 and flux amount flowing through the armature is made to be smaller, electric current to increase number of magnet elements with the second magnetization in the control magnets 88, 89 is supplied to the excitation coil 78 and the armature coils 76, and magnetization state of the control magnet 88, 89 is changed, and then flux amount flowing through the armature is reduced. When power generation voltage becomes smaller than optimal voltage that charges the battery 268 and flux amount flowing through the armature is made to be larger, electric current to increase number of magnet elements with the first magnetization in the control magnets 88, 89 is supplied to the excitation coil 78 and the armature coils 76, and magnetization state of the control magnet 88, 89 is changed, and then flux amount flowing through the armature is increased.

Since the rotating electric machine apparatus is used as a constant voltage dynamo, when charging the battery 268, the converter that changes power generation voltage is unnecessary. Furthermore, the expensive converter can be made unnecessary by controlling on the optimal power generation voltage for each battery, even when a battery 268 includes two or more sorts of batteries with different in its voltage. Moreover, when charging the battery 268, the proportioning control of driving load and power generation load is also possible with the amount control of magnetic flux and the control of charging current.

This embodiment functions effectively also as an energy recovery system at the time of braking of the hybrid car. When directions of regenerative braking are received through the instruction 26b, the control device 264 makes electric current supplied to the excitation coil 78 and the armature coils 76 larger so as to increase number of magnet elements with the first magnetization in the control magnets 88, 89, and magnetization state of the control magnet 88, 89 is changed, then flux amount flowing through the armature is increased, and makes the battery 268 charge.

The electric power that can be taken out is large because flux amount through the armature coil 76 is increased, and is temporarily stored in storage systems with electric double layer capacitor, etc., and energy recovery becomes large as well as braking force is secured. Since the rotating electric machine apparatus 261 is the physique employed as the electric motor for drive, so enough braking force can be generated as a generator for regenerative braking.

Although this embodiment employs the rotating electric machine system as a generator and a motor of the hybrid car, it is also possible to consider as the rotating electric machine system in an electric vehicle. In that case, the engine 262, the transmission 263, the rotary shaft 269 of the hybrid car are removed in the above-mentioned embodiment, and energy recovery system in the braking time and driving system are composed only by the rotating electric machine system of the embodiment of the present invention.

As described above, the rotating electric machine system of the embodiments of the present invention has been explained. These embodiments are mere examples for realizing the theme or the purpose of the present invention and do not limit the scope of the invention. For example, although the rotating electric machine was explained as the composition having a radial gap structure in the above-mentioned explanation, naturally the composition that a disk-shaped armature and a rotor face axially, the composition that a rotor and an armature and a rotor are lined axially in this order etc. are also possible. Further, a rotating electric machine may change combination, such as composition of a rotor magnetic pole, composition of an armature, and composition of a magnetic excitation part in the above-mentioned embodiment to realize the meaning of the present invention.

The rotating electric machine system according to the embodiments of the present invention can utilize magnet torque and reluctance torque similarly to a conventional rotating electric machine, and furthermore, improves the function of the power generation, and also can control the power-generation function. By applying the embodiments of the present invention as an electric generator and electric motor system for automobile application, the rotational speed range is able to be larger than the conventional one, and high torque output feature with lower current can be expected. Additionally, energy recovery in braking is enabled to improve the overall energy consumption.

In a rotating electric machine system according to the embodiment of the present invention, a rotor has magnetic salient poles alternately in circumferential direction magnetized in different polarities from each other by permanent magnets of which magnetization is fixed, a control magnet is arranged in inside part of the magnetic salient pole, an excitation coil is arranged to excite the rotor collectively, and the magnetization of the control magnet that magnetic flux generated by an armature coil and excitation flux generated by the excitation coil flow to the same direction is changed selectively.

The outputs for optimization are output torque, braking power and recovery energy amount during regeneration braking, and power generation voltage, etc.

The permanent magnet arranged within the magnetic salient pole or between adjacent magnetic salient poles has coercive force of enough size that magnetization change cannot be made easily. The inside part of the magnetic salient pole where the control magnet is arranged is the side away from the armature, and is pointing the location that the magnetic flux by the armature coil hardly affects. A product of coercive force and magnetization direction length which indicates magnetization easiness of the control magnet is set so that the magnetization cannot be changed by magnetic flux the armature coil usually makes and also the magnetization can be changed by synthetic magnetic flux flowing in the same direction from the excitation coil and the armature coil. When the control magnet is arranged in adjacent magnetic salient poles, respectively, the magnetization directions of the adjacent control magnets are mutually reverse, changing the direction of the excitation flux that the exciting coil generates, the magnetization of the control magnet is changed sequentially.

There is a composition to supply the excitation flux collectively to the armature and the rotor as a magnetic flux path configuration example of the excitation flux. Both ends of the excitation flux path member are magnetically coupled with the rotor or the armature arranged at ends of armature/rotor group that an armature and a rotor queue up alternately through a minute gap, the excitation flux path member and the rotor and the armature constitute a closed magnetic circuit, and the excitation coil is arranged so as to generate the excitation flux in the closed magnetic circuit. Being magnetically combined is pointed out as the state that two magnetic bodies are connected directly or are faced through a minute gap. The excitation coil can be placed in standstill side as constitution to go around an axis. Any structures, such as structure where one or more cylindrical armature and rotor counter through gap(s) radially, structure where one or more disk-like armature and rotor counter through gap(s) axially, and structure where one or more armature and rotor with cone surface counter through gap(s), are possible for rotating electric machine.

There is a composition which two axially aligned rotors counter with the armature as other magnetic flux path configuration example of the excitation flux. The excitation coil is placed between axial middle of the armature or between two rotors, and generates the excitation flux in a closed magnetic circuit composed by the armature, the first rotor and the second rotor. The excitation flux flows in the first rotor and the second rotor in opposite direction each other, moreover, magnetic flux generated by the armature coil flows in circumferentially adjacent magnetic salient poles into opposite direction each other, and therefore magnetization of the control magnet that does not queue up axially among the first rotor and the second rotor is changed at the same time.

The control magnet is composed of parallel connection of magnet elements which are different in easiness of magnetization, or includes a permanent magnet whose easiness of magnetization (that is the product of length and coercivity) changes continuously within section thereof. The purpose of the composition of the above-mentioned control magnet is in control of flux amount through the armature coil, arrangement of the magnet element with different magnetic easiness is distributed throughout the rotor without being limited in one section. The magnet element that magnetizes the magnetic salient pole to the same polarity as the permanent magnet near the magnetic salient pole is assumed to be the first magnetization, and increases the amount of magnetic flux through the armature coil.

In the above-mentioned rotating electric machine system, there is composition which is made to concentrate the excitation flux on the control magnet, and changes magnetization of the control magnet easily. That is, a conductor is arranged at least one magnetic pole side of the permanent magnet, and pulse-like magnetic flux cannot flow through the inside of the permanent magnet easily due to the eddy current induced in the conductor. An excellent material in conductivity to restrain generation of heat because of the eddy current is used for the conductor. Due to the above-mentioned composition, the bidirectional pulse-like flux which the armature coil generates is hard to pass the permanent magnet, the flux is concentrated on the control magnet, and magnetization of the control magnet is changed easily.

In the above-mentioned rotating electric machine system, the field control which superimposes magnetic flux by current supplied to the excitation coil in addition to the magnetic flux from the control magnet is further possible. Control magnets with thickness of big and small is arranged alternately in adjacent magnetic salient poles so that difference in the easiness of magnetic flux passing by the excitation coil is installed. A flux adjusting current of a degree that does not make the control magnet cause irreversible magnetization change is supplied to the excitation coil in each magnetization state of the control magnet, and the induced flux is superimposed on a flux coming from the control magnet. Therefore, the amount of the magnetic flux flowing through the armature is adjusted. Even if it is possible to change magnetization of the control magnet continuously, in most cases, magnetization change of the control magnet is carried out intermittently. The amount of flux flowing through the armature is controlled discretely in many cases as a result. In the embodiment of the present invention, a flux induced by the excitation coil is superimposed on a flux coming from the control magnet in each magnetization state of the control magnet, and the amount of a magnetic flux flowing through the armature is precisely controlled.

In the rotating electric machine apparatus, the rotating electric machine is an electric motor when a current to the armature coils is input and a rotational force is output, and the rotating electric machine is an electric generator when the rotational force is input and current is output from the armature coils. Optimal magnetic structures exist in the electric motor or the electric generator, but are reversible, and the rotating electric machine system of the embodiment of the present invention can be applied to both of the electric motor and the electric generator.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A rotating electric machine system comprising:
a rotor having a rotor plane;
an armature having an armature plane facing the rotor plane and being relatively rotatable with respect to the rotor;

the rotor comprising magnetic salient poles in a circumferential direction on the rotor plane, adjacent magnetic salient poles being magnetized in different polarities from each other by a permanent magnet arranged in the magnetic salient pole and or by a permanent magnet arranged between the magnetic salient poles; and the armature comprising:
magnetic teeth in the circumferential direction on the armature plane; and
armature coils wound around the magnetic teeth;

wherein a control magnet is arranged in an inside part of at least one of the adjacent magnetic salient poles in circumferential direction that is away from the armature, wherein an excitation flux path member and an excitation coil are provided, the excitation coil being placed so as to generate an excitation flux collectively in a magnetic flux path including the excitation flux path member, the armature, and the rotor, wherein product of a magnetization direction length and coercivity is set up so that a magnetization state of the control magnet is not changed only depending on a magnetic flux from the armature coils, wherein the rotating electric machine is constituted so that the magnetization state of the control magnet where the magnetic flux by the armature coils and the excitation flux flow in a same direction is changed irreversibly, and wherein an amount of the magnetic flux flowing through the armature coils is controlled by changing the magnetization state of the control magnet in accordance with an output of the rotating electric machine system so that the output is optimized.

2. The rotating electric machine system according to claim 1, wherein both ends of the excitation flux path member are magnetically coupled respectively with one of the rotor and the armature arranged at an end of an armature/rotor group having an armature and a rotor alternately through a minute gap so that the excitation flux is generated collectively in a magnetic flux path including the excitation flux path member, the armature, and the rotor.

3. The rotating electric machine system according to claim 2, wherein the rotor arranged at one end of an armature/rotor group having an armature and a rotor alternately through a minute gap has the magnetic salient poles mounted on a magnetic substrate; and wherein an end of the excitation flux path member is magnetically coupled with the magnetic substrate.

4. The rotating electric machine system according to claim 2, wherein the armature arranged at one end of an armature/rotor group having an armature and a rotor alternately through a minute gap has the armature coils and the magnetic teeth disposed on a magnetic yoke; and wherein an end of the excitation flux path member is magnetically coupled with the magnetic yoke.

5. The rotating electric machine system according to claim 2, wherein the armature, the rotor, and the armature form a line by this order through a minute gap;

wherein the rotor comprises magnetic salient poles being sectioned in circumferential direction by a non-magnetic member and/or a permanent magnet, and the adjacent magnetic salient poles in circumferential direction are magnetized in different direction each other; and wherein the control magnet is arranged about midway between both end surfaces of the magnetic salient poles.

6. The rotating electric machine system according to claim 1, wherein a first rotor and a second rotor are disposed axially, and face the armature radially;

wherein a magnetic salient pole of the first rotor and a magnetic salient pole of the second rotor magnetized in a same polarity queue up axially;

wherein a cylindrical magnetic core is arranged at the first rotor and the second rotor;

wherein the control magnet is disposed in an inside part of at least one of the adjacent magnetic salient poles in circumferential direction;

wherein the excitation flux path member is arranged so that a cylindrical magnetic core of the first rotor and a cylindrical magnetic core of the second rotor are combined magnetically; and wherein the excitation coil is arranged so that the excitation flux is generated in a magnetic flux path which includes the armature, the first rotor, the excitation flux path member, and the second rotor.

7. The rotating electric machine system according to claim 1, wherein the control magnet is made parallel by magnet elements having mutually different product of magnetization direction length and coercivity;

wherein the magnet elements possess either one of a first magnetization and a second magnetization to which the magnetization direction is reverse each other; and wherein a magnet element among the magnet elements having the first magnetization magnetizes the magnetic salient poles in a same polarity as the permanent magnet magnetizes.

8. The rotating electric machine system according to claim 1, wherein the excitation flux flowing to opposite direction for magnetization to be reversed in the control magnet is supplied to the rotor collectively by the excitation coil; and wherein a magnetic flux flowing to opposite direction for the magnetization to be reversed is generated by an armature coils among the armature coils facing a magnetic salient pole among the magnetic salient poles including the control magnet with the magnetization to be reversed, and the magnetization state of the control magnet is changed.

9. The rotating electric machine system according to claim 1, wherein the excitation flux flowing to opposite direction for magnetization to be reversed in the control magnet is supplied to the rotor collectively by the excitation coil; and wherein electric current is supplied to the armature coils so that magnetic flux flowing to opposite direction for the magnetization to be reversed is generated in a magnetic salient pole among the magnetic salient poles having the control magnet with the magnetization to be reversed as well as magnetic flux flowing to a same direction for the magnetization to be reversed is generated in a magnetic salient pole among the magnetic salient poles adjacent to the magnetic salient pole having the control magnet with the magnetization to be reversed, and the magnetization state of the control magnet is changed.

10. The rotating electric machine system according to claim 1, wherein the excitation flux flowing to opposite direction for magnetization to be reversed in the control magnet is supplied to the rotor collectively by the excitation coil; and wherein electric current is supplied to the armature coils so that a magnetic flux flowing to opposite direction for the magnetization to be reversed is generated in the magnetic teeth facing a magnetic salient pole among the magnetic salient poles having the control magnet with the magnetization to be reversed as well as magnetic flux flowing to a same direction for the magnetization to be reversed is generated in the magnetic teeth facing a magnetic salient pole among the magnetic salient pole adjacent to the magnetic salient pole having the control magnet with the magnetization to be reversed, and the magnetization state of the control magnet is changed.

11. The rotating electric machine system according to claim 1, wherein a non-magnetic conductor is arranged between at least one magnetic pole of the permanent magnet and the magnetic salient poles.

12. The rotating electric machine system according to claim 1, wherein a magnet assembly comprising permanent magnets placed on two sides of a magnetic substance is disposed between the adjacent magnetic salient poles; and wherein the magnet assembly comprises a non-magnetic member so that the excitation flux generated by the excitation coil is hard to flow through the magnet assembly.

13. The rotating electric machine system according to claim 1, wherein the control magnet having larger magnetization direction thickness and the control magnet having smaller magnetization direction thickness are arranged alternately in circumferential direction; and wherein flux adjustment current is supplied to the excitation coil, and a flux amount through the armature coil is controlled.

14. The rotating electric machine system according to claim 1, wherein a supervisor of generation voltage appearing in at least one armature coil is arranged;

wherein the generation voltage that is supervised results from magnetic flux through the armature coil according to rotation of the rotor; and wherein an amplitude of current to be supplied to the excitation coil and the armature coils is increased in case that each amplitude change of the generation voltage is smaller than an expected value as a result of having a changed magnetization state of the control magnet, and is decreased in case that each amplitude change of the generation voltage is larger than the expected value.

15. The rotating electric machine system according to claim 1, further comprising a control device;

wherein a rotational force is an input;

wherein a magnet element that magnetizes the magnetic salient poles in a same polarity as the permanent magnet arranged around the magnetic salient poles magnetizes is assumed as a first magnetization;

wherein the control device supplies current to the excitation coil and the armature coils so that a magnetic pole area of the first magnetization is decreased when a power generation voltage induced in the armature coils is larger than a predetermined value and an amount of a magnetic flux flowing through the armature is to be reduced, and supplies current to the excitation coil and the armature coils so that a magnetic pole area of the first magnetization is increased when the power generation voltage induced in the armature coils is smaller than the predetermined value and an amount of a magnetic flux flowing through the armature is to be increased; and wherein the power generation voltage is controlled to be the predetermined value.

16. The rotating electric machine system according to claim 1, further comprising a control device;

wherein a current supplied to the armature coils is an input;

wherein a magnet element that magnetizes the magnetic salient poles in a same polarity as the permanent magnet arranged around the magnetic salient poles magnetizes is assumed as a first magnetization;

the control device supplies current to the excitation coil and the armature coils so that a magnetic pole area of the first magnetization is decreased when a rotational speed is larger than a predetermined value and an amount of a magnetic flux flowing through the armature is to be reduced, and supplies current to the excitation coil and the armature coils so that a magnetic pole area of the first magnetization is increased when the rotational speed is smaller than the predetermined value and an amount of a magnetic flux flowing through the armature is to be increased; and wherein thereby a rotational force is optimally controlled.

17. The rotating electric machine system according to claim 1, further comprising a control device;

wherein a current supplied to the armature coils is an input;

a magnet element that magnetizes the magnetic salient poles in a same polarity as the permanent magnet arranged around the magnetic salient poles magnetizes is assumed as a first magnetization;

the control device supplies current to the excitation coil and the armature coils so that a magnetic pole area of the first magnetization is increased when a rotational speed is to be reduced;

an amount of a magnetic flux flowing through the armature is increased; and a rotational energy is taken out as a power generation output.

18. A method for controlling a magnetic flux amount for a rotating electric machine system comprising a rotor having a rotor plane and an armature having an armature plane facing the rotor plane and being relatively rotatable with respect to the rotor, the rotor comprising magnetic salient poles in a circumferential direction on the rotor plane, adjacent magnetic salient poles being magnetized in different polarities from each other by a permanent magnet arranged in the magnetic salient pole and or by a permanent magnet arranged between the magnetic salient poles, and the armature comprising armature coils in a circumferential direction on the armature plane facing the rotor, said method comprising:

arranging a control magnet in an inside part of at least one of the adjacent magnetic salient poles in a circumferential direction that is away from the armature;

providing an excitation flux path member and an excitation coil;

placing the excitation coil so as to generate an excitation flux collectively in a magnetic flux path including the armature and the rotor;

setting up product of a magnetization direction length and coercivity so that a magnetization state of the control magnet is not changed only depending on a magnetic flux from the armature coil;

constituting the rotating electric machine so that the magnetization state of the control magnet where the excitation flux and the magnetic flux by the armature coils flow in a same direction is changed irreversibly; and supplying current to the excitation coil and the armature coils, and changing the control magnet magnetization irreversibly to control an amount of the magnetic flux flowing through the armature.

* * * * *